(12) United States Patent
Han et al.

(10) Patent No.: US 9,247,534 B2
(45) Date of Patent: Jan. 26, 2016

(54) METHOD AND APPARATUS FOR TRANSMITTING CONTROL INFORMATION IN WIRELESS COMMUNICATION SYSTEM

(75) Inventors: Seung Hee Han, Anyang-si (KR); Jae Hoon Chung, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/806,584

(22) PCT Filed: May 4, 2011

(86) PCT No.: PCT/KR2011/003343
§ 371 (c)(1),
(2), (4) Date: Dec. 21, 2012

(87) PCT Pub. No.: WO2011/162482
PCT Pub. Date: Dec. 29, 2011

(65) Prior Publication Data
US 2013/0100919 A1    Apr. 25, 2013

Related U.S. Application Data

(60) Provisional application No. 61/358,419, filed on Jun. 25, 2010, provisional application No. 61/361,877, filed on Jul. 6, 2010.

(30) Foreign Application Priority Data

Jan. 10, 2011    (KR) .................. 10-2011-0002268

(51) Int. Cl.
| | | |
|---|---|---|
| H04W 72/04 | (2009.01) | |
| H04L 1/00 | (2006.01) | |
| H04L 1/16 | (2006.01) | |
| H04W 99/00 | (2009.01) | |
| H04L 5/00 | (2006.01) | |
| H04L 27/26 | (2006.01) | |

(52) U.S. Cl.
CPC .......... *H04W 72/0413* (2013.01); *H04W 99/00* (2013.01)

(58) Field of Classification Search
CPC ............ H04W 72/0413; H04W 74/00; H04W 72/0406; H04L 5/0055; H04L 1/0027
USPC .................................................. 370/329, 252
See application file for complete search history.

(56) References Cited

U.S. PATENT DOCUMENTS

| | | | |
|---|---|---|---|
| 8,391,268 B2 * | 3/2013 | Papasakellariou et al. ... | 370/344 |
| 2009/0103482 A1 * | 4/2009 | Imamura et al. .............. | 370/329 |
| 2010/0111209 A1 * | 5/2010 | Frenger ........................ | 375/260 |
| 2010/0272048 A1 * | 10/2010 | Pan et al. ...................... | 370/329 |
| 2011/0242997 A1 * | 10/2011 | Yin ................................ | 370/252 |

FOREIGN PATENT DOCUMENTS

| | | |
|---|---|---|
| KR | 10-2010-0012034 A | 2/2010 |
| KR | 10-2010-0014333 A | 2/2010 |
| KR | 10-2010-0019953 A | 2/2010 |

OTHER PUBLICATIONS

Multiplexing capability of CQIs and ACK/NACKs form differenct UEs 3GPP TSG RAN WG1 Meeting #49 R1-072315 May 7-11, 2007.*

* cited by examiner

*Primary Examiner* — Un C Cho
*Assistant Examiner* — Peian Lou
(74) *Attorney, Agent, or Firm* — Dentons US LLP

(57) ABSTRACT

The present invention relates to a wireless communication system. Specifically, the present invention relates to a method for transmitting control information through a PUCCH in a wireless communication system and an apparatus therefore including the steps of: generating the control information; selecting a particular PUCCH format from a plurality of PUCCH formats; and transmitting the control information through the particular PUCCH format.

8 Claims, 27 Drawing Sheets

FIG. 5
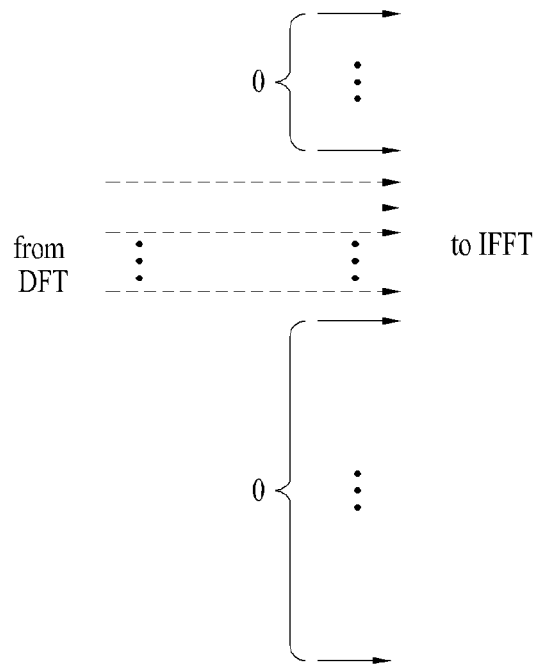
(a)
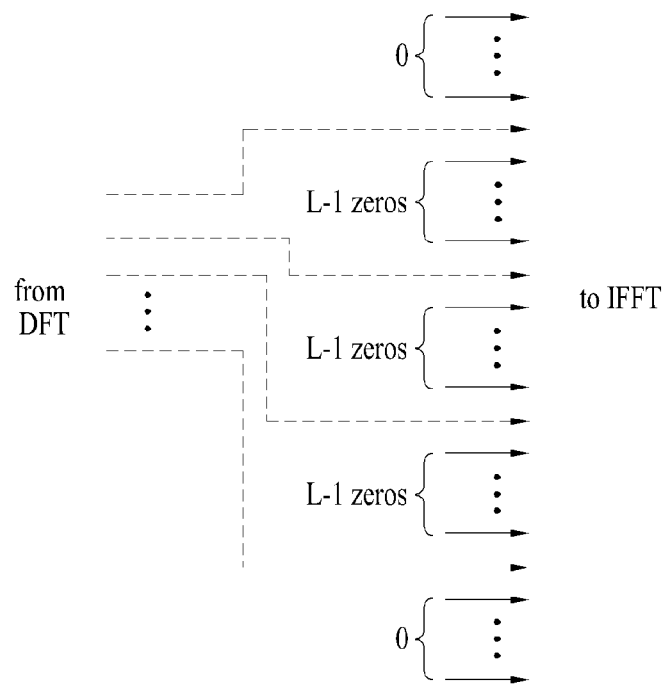
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\triangle_{shift}^{PUCCII} = 2$

| Cell specific cyclic shift offset | | RS orthogonal cover | | | ACK/NACK orthogonal cover | | |
|---|---|---|---|---|---|---|---|
| $\delta_{offset}^{PUCCII} - 1$ | $\delta_{offset}^{PUCCII} - 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\delta_{offset}^{PUCCII} \in \{0,1,...,\triangle_{shift}^{PUCCII} - 1\}$ Cell specific cyclic shift offset $\triangle_{shift}^{PUCCII} \in \{\{1,2,3\}$ for normal cyclic prefix, $\{1,2,3\}$ for extended cyclic prefix$\}$   Cell-specific Cyclic shift value of CAZAC sequence $n_{OC}$   Orthogonal sequence index for ACK/NACK
$\bar{n}_{OC}$   Orthogonal sequence index for RS
$n_{CS}$   Cyclic shift value of a CAZAC sequence
n'   ACK/NACK resource index used for the channelization in a RB

METHOD AND APPARATUS FOR TRANSMITTING CONTROL INFORMATION IN WIRELESS COMMUNICATION SYSTEM

This Application is a 35 U.S.C. §371 National Stage Entry of International Application No. PCT/KR2011/003343 filed May 4, 2011 and claims the benefit of U.S. Provisional Application Nos. 61/358, 419 filed Jun. 25, 2010 and 61/361,877 filed Jul. 6, 2010 and Korean Application No. 10-2011-0002268 filed Jan. 10, 2011, all of which are incorporated by reference in their entirety herein.

TECHNICAL FIELD

The present invention relates to a wireless communication system, and more particularly to a method and apparatus for transmitting control information in a wireless communication system supporting carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for efficiently transmitting control information in a wireless communication system that substantially obviate one or more problems due to limitations and disadvantages of the related art. An object of the present invention is to provide a method and apparatus for efficiently transmitting control information in a wireless communication system. Another object of the present invention is to provide a channel format and signal processing for effectively transmitting control information, and an apparatus for the channel format and the signal processing. A further object of the present invention is to provide a method and apparatus for effectively allocating resources for transmitting control information.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for allowing a user equipment (UE) to transmit control information over a physical uplink control channel (PUCCH) in a wireless communication system including: generating the control information; selecting a specific PUCCH format from a plurality of PUCCH formats; and transmitting the control information through the specific PUCCH format.

In another aspect of the present invention, a user equipment (UE) configured to transmit control information through a physical uplink control channel (PUCCH) in a wireless communication system includes: a radio frequency (RF) unit; and a processor, wherein the processor generates the control information, selects a specific PUCCH format from a plurality of PUCCH formats, and transmits the control information through the specific PUCCH format.

The specific PUCCH format may be indicated through higher layer signaling.

The specific PUCCH format may be selected on the basis of the number of component carriers (CCs) configured for the user equipment (UE).

The specific PUCCH format may be selected on the basis of the number of bits of the control information.

The control information may include at least two kinds of control information, and the specific PUCCH format may be selected on the basis of a control information combination constructing the control information.

Advantageous Effects

Exemplary embodiments of the present invention have the following effects. Control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a signal mapping scheme in a frequency domain so as to satisfy single carrier characteristics.

FIG. 17 is a diagram showing ACK/NACK channelization of PUCCH formats 1a and 1b.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
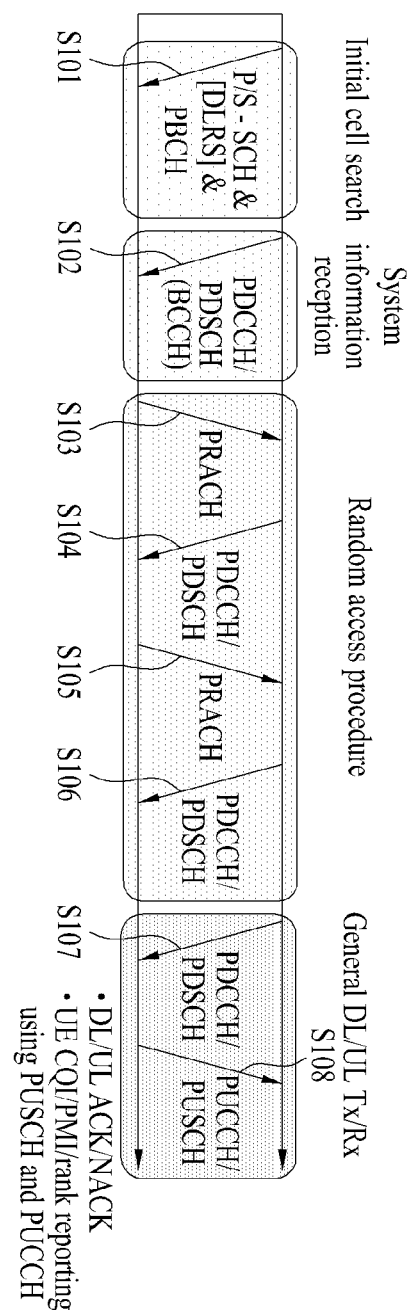
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
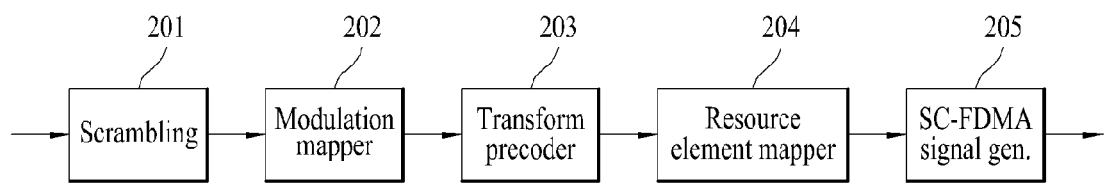
FIG. 2 is a conceptual diagram illustrating a method for processing an uplink signal.

FIG. 2 is a conceptual diagram illustrating a signal processing method for transmitting an uplink signal by a user equipment (UE).

Referring to FIG. 2, the scrambling module 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3:
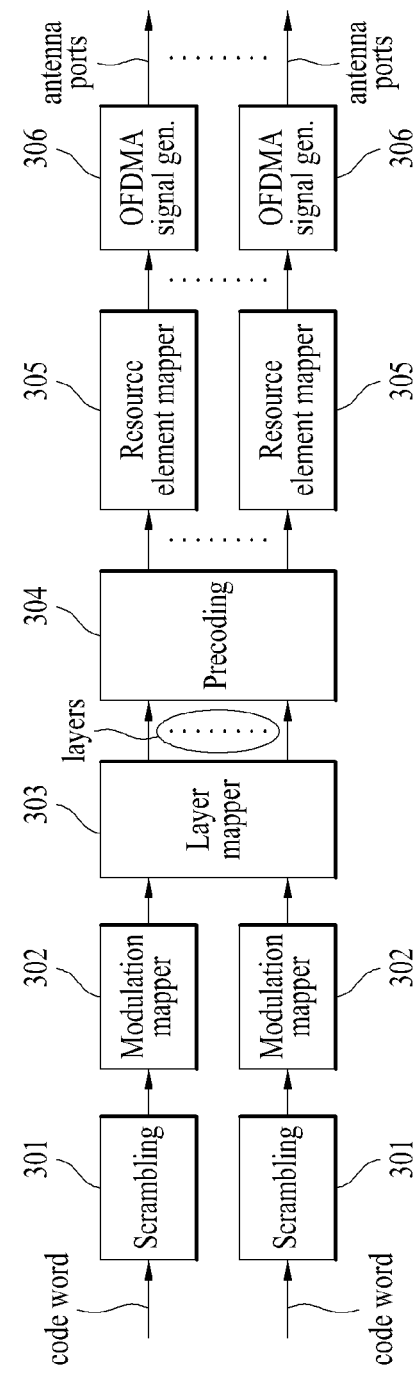
FIG. 3 is a conceptual diagram illustrating a method for processing a downlink signal.

FIG. 3 is a conceptual diagram illustrating a signal processing method for transmitting a downlink signal by a base station (BS).

Referring to FIG. 3, the BS can transmit one or more codewords via a downlink in a 3GPP LTE system. Codewords may be processed as complex symbols by the scrambling module 301 and the modulation mapper 302 in the same manner as in the uplink operation shown in FIG. 2. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a wireless communication system transmits an uplink signal, a Peak to Average Power Ratio (PAPR) may become more serious than in the case where the BS transmits a downlink signal. Thus, as described in FIGS. 2 and 3, the SC-FDMA scheme is used for uplink signal transmission in a different way from the OFDMA scheme used for downlink signal transmission.

Figure 4:
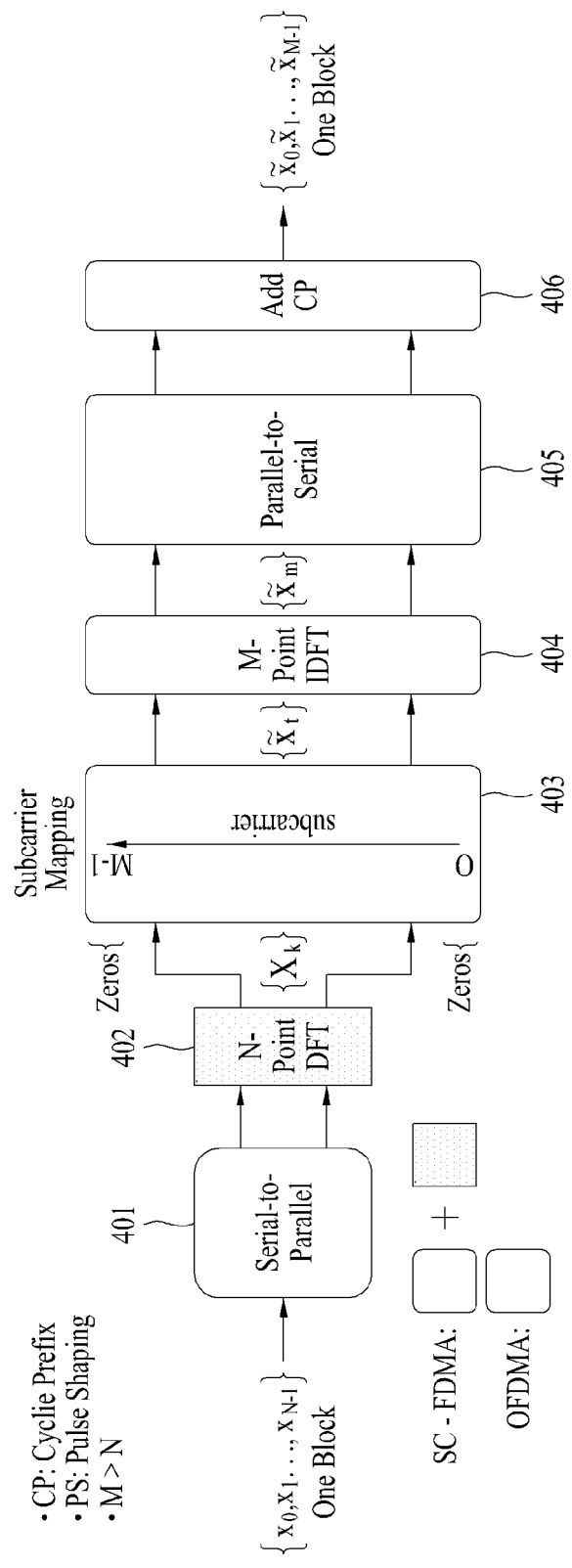
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

FIG. 5 illustrates a signal mapping scheme in the frequency domain for satisfying the single carrier properties. FIG. 5 (a) shows a localized mapping scheme and FIG. 5 (b) shows a distributed mapping scheme.

A clustered SC-FDMA scheme which is a modified form of the SC-FDMA scheme is described as follows. In the clustered SC-FDMA scheme, DFT process output samples are divided into sub-groups in a subcarrier mapping procedure and are non-contiguously mapped in the frequency domain (or subcarrier domain).

Figure 6:
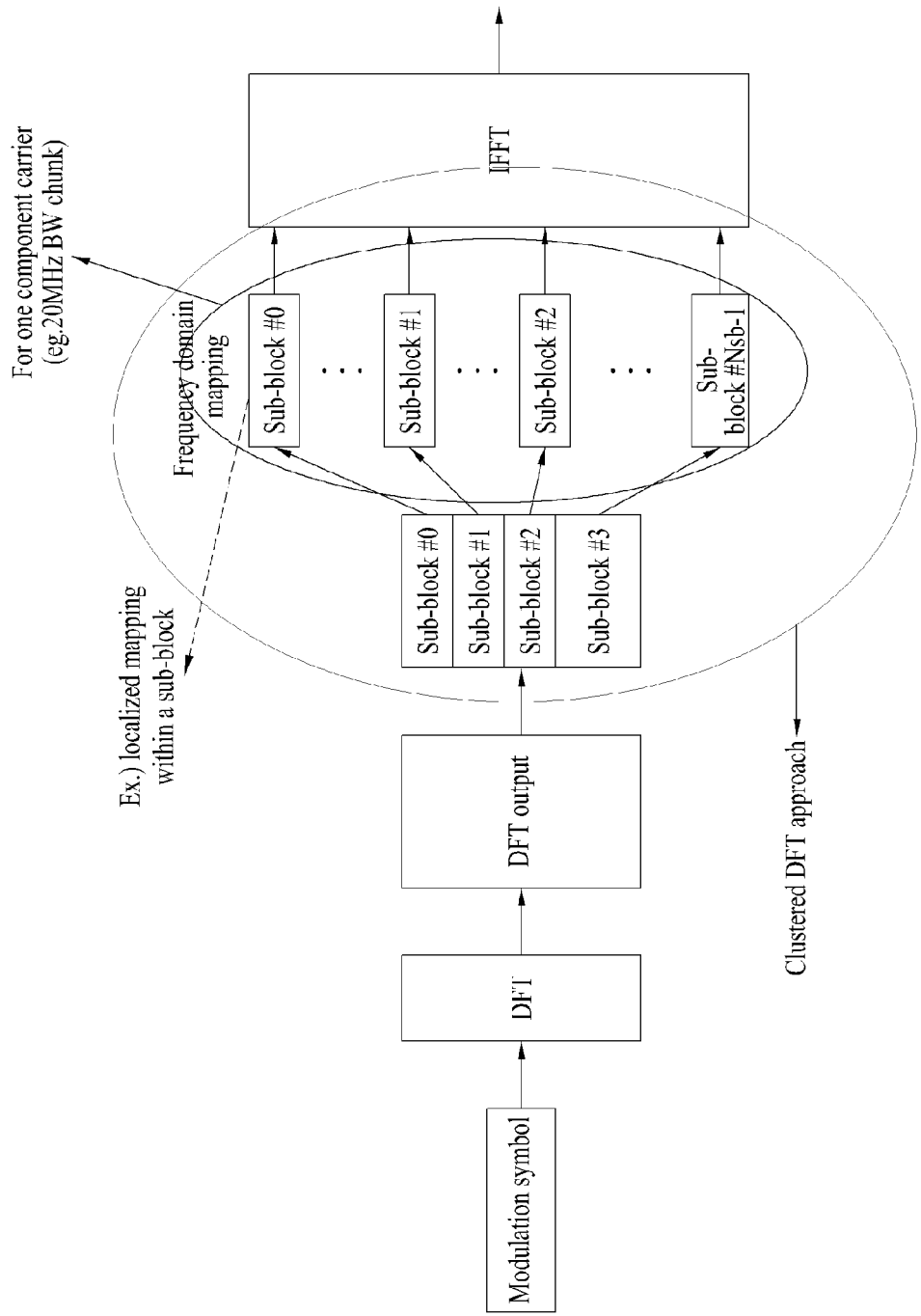
FIG. 6 is a conceptual diagram illustrating the signal processing for mapping DFT process output samples to a single carrier in a clustered SC-FDMA.
Figure 7:
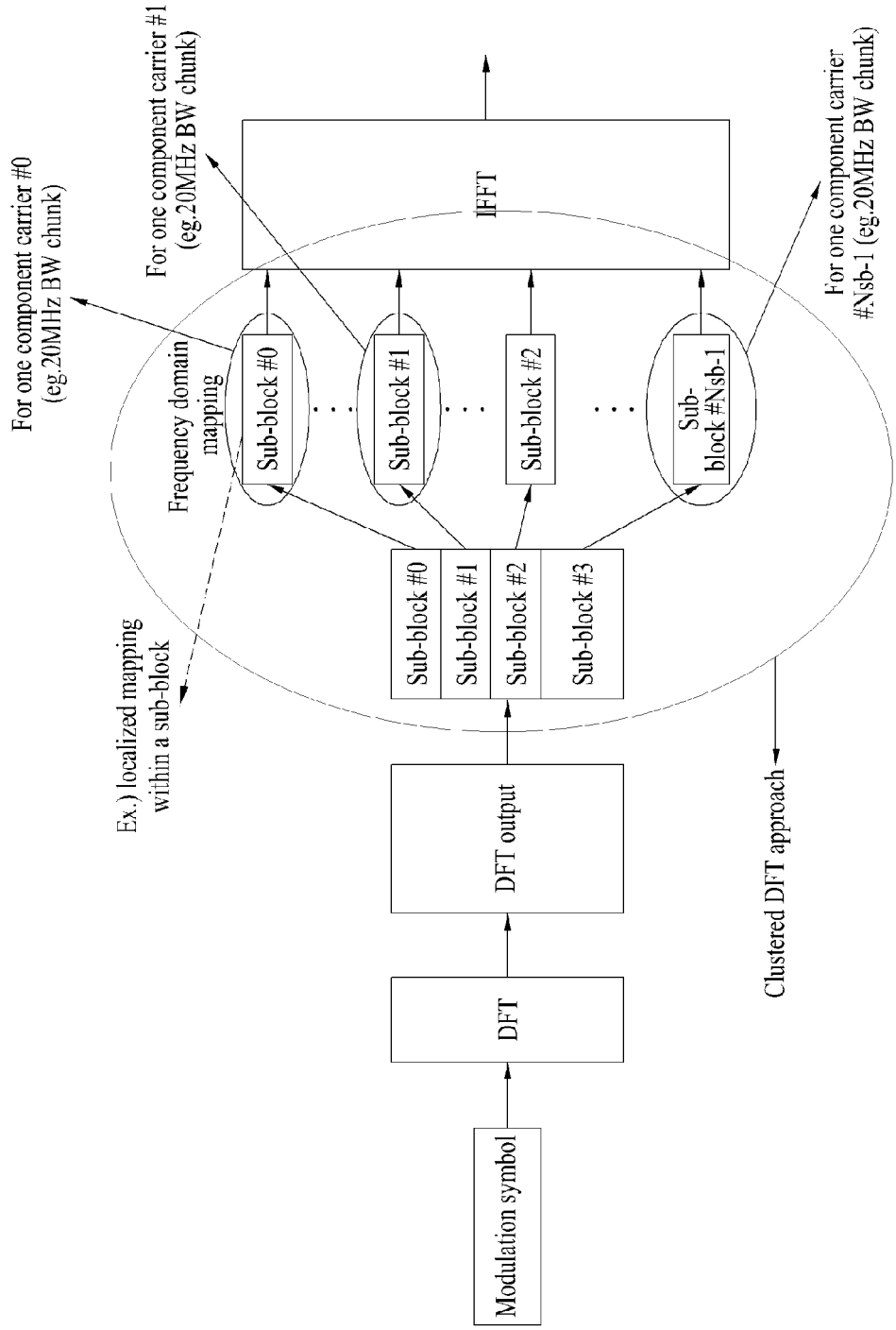
FIGS. 7 and 8 show the signal processing in which DFT process output samples are mapped to multiple carriers in a clustered SC-FDMA.
Figure 8:
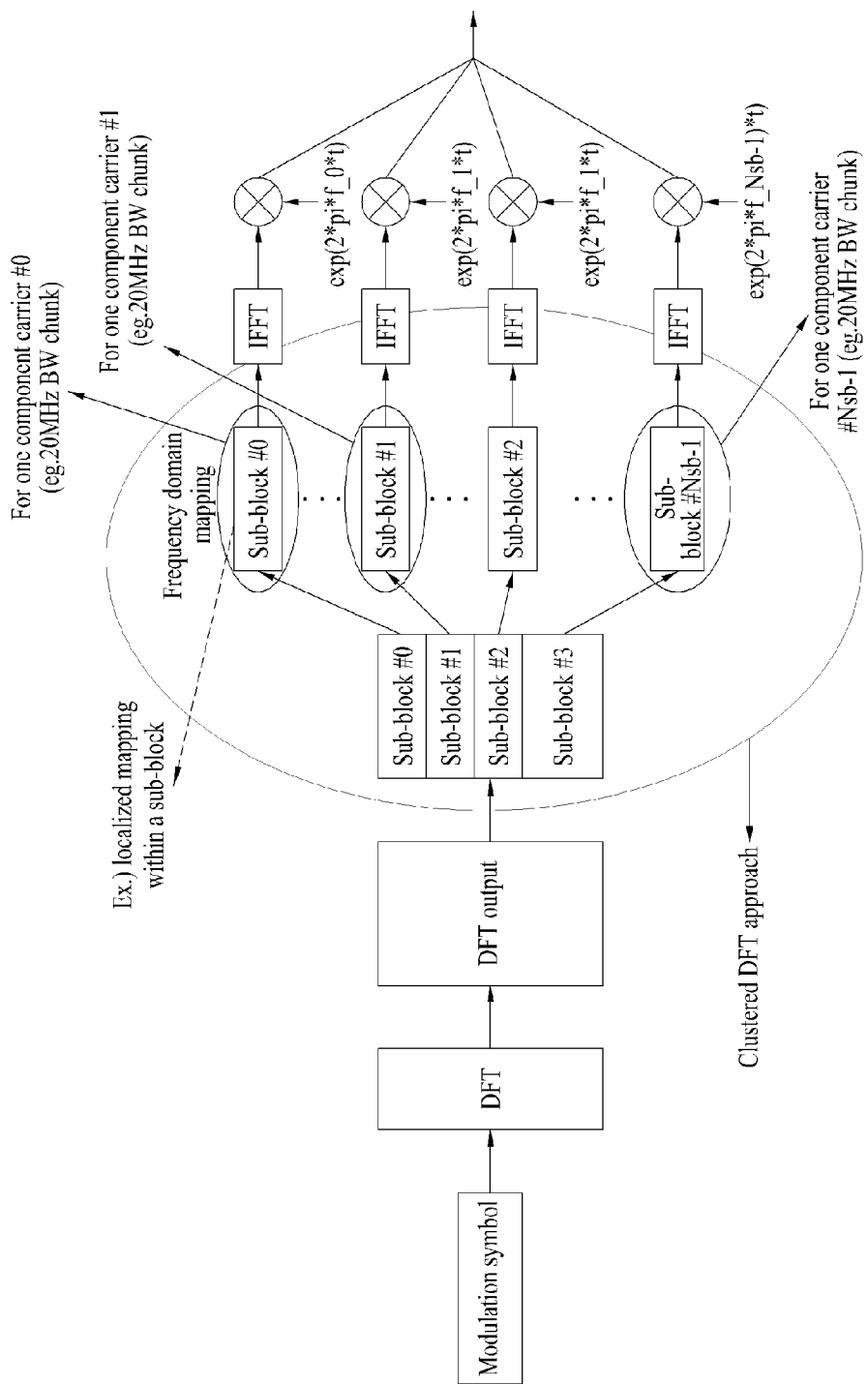

FIG. 6 shows signal processing in which DFT-process output samples are mapped to one carrier in the clustered SC-FDMA. FIGS. 7 and 8 show signal processing in which DFT process output samples are mapped to multicarriers in a clustered SC-FDMA. FIG. 6 shows the example of intra-carrier cluster SC-FDMA application. FIGS. 7 and 8 show examples of the inter-carrier clustered SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
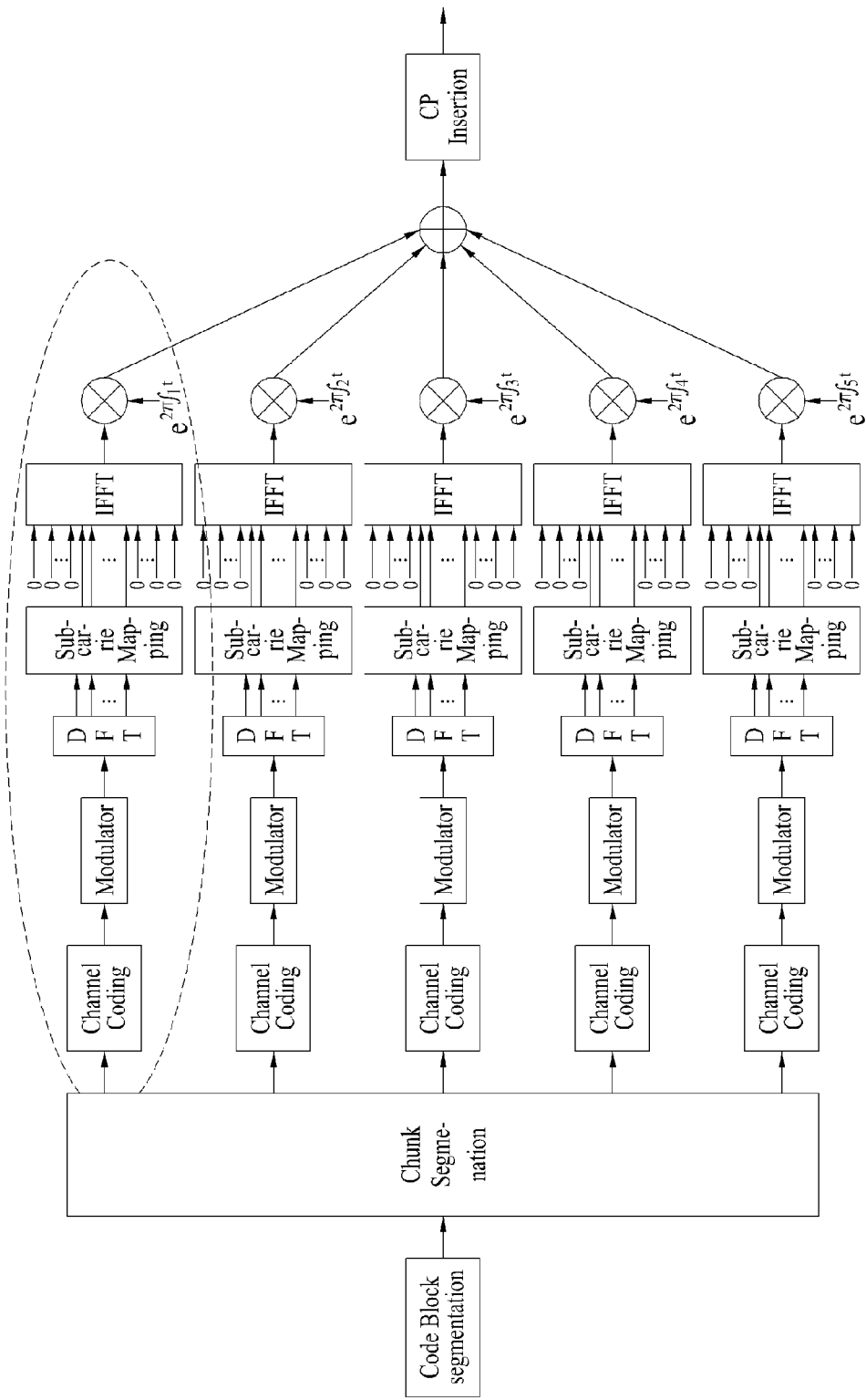
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFT-s-OFDMA. For convenience of description and better understanding of the present invention, the segmented SC-FDMA, NxSC-FDMA and NxDFT-s-OFDMA may be generically referred to as 'segment SC-FDMA'. Referring to FIG. 9, in order to reduce single carrier characteristics, the segment SC-FDMA groups all the time domain modulation symbols into N groups, such that a DFT process is performed in units of a group.

Figure 10:
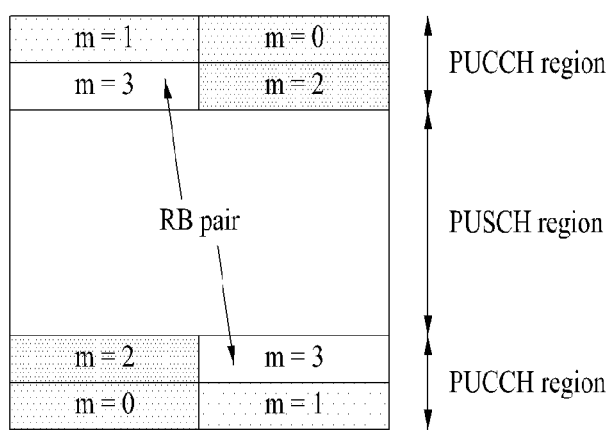
FIG. 10 shows an uplink subframe structure.

FIG. 10 shows an uplink subframe structure.

As shown in FIG. 10, the UL subframe includes a plurality of slots (e.g., two slots). Each slot may include a plurality of SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes a pair of RBs (e.g., m=0, 1, 2, 3) located at both ends of the data region on the frequency axis (specifically, a pair of RBs at frequency mirrored locations) and hops between slots. The UL control information (i.e., UCI) includes HARQ ACK/NACK, Channel Quality Information (CQI), Precoding Matrix Indicator (PMI), and Rank Indication (RI).

Figure 11:
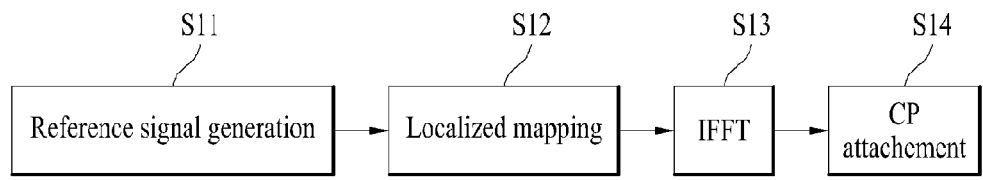
FIG. 11 is a conceptual diagram illustrating a signal processing procedure for transmitting a reference signal (RS) on uplink.

FIG. 11 illustrates a signal processing procedure for transmitting a Reference Signal (RS) in the uplink. As shown in FIG. 11, data is transformed into a frequency domain signal by a DFT precoder and the signal is then transmitted after being subjected to frequency mapping and IFFT. On the other hand, an RS does not pass through the DFT precoder. More specifically, an RS sequence is directly generated in the frequency domain (S11) and is then transmitted after being sequentially subjected to a localized-mapping process (S12), an IFFT process (S13), and a CP attachment process (S14).

The RS sequence $r_{u,v}^{(\alpha)}(n)$ is defined by a cyclic shift cc of a base sequence and may be expressed by the following equation 1.

$$r_{u,v}^{(\alpha)}(n) = e^{j\alpha n}\bar{r}_{u,v}(n), \ 0 \le n < M_{sc}^{RS}, \quad \text{[Equation 1]}$$

where $M_{sc}^{RS}=mN_{sc}^{RB}$ denotes the length of the RS sequence, $N_{sc}^{RB}$ denotes the size of a resource block represented in subcarriers, and m is $1 \le m \le N_{RB}^{max,UL}$. $N_{RB}^{max,UL}$ denotes a maximum UL transmission band.

A base sequence $\bar{r}_{u,v}(n)$ is divided into several groups. $u \in \{0, 1, \ldots, 29\}$ denotes group number, and V corresponds to a base sequence number in a corresponding group. Each group includes one base sequence v=0 having a length of $M_{sc}^{RS}=mN_{sc}^{RB}$ ($1 \le m \le 5$), and two base sequences v=0,1 having a length of $M_{sc}^{RS}=mN_{sc}^{RB}$ ($6 \le m \le N_{RB}^{max,UL}$). The sequence group number u and the number v within a corresponding group may be changed with time. The base sequence $\bar{r}_{u,v}(0), \ldots, \bar{r}_{u,v}(M_{sc}^{RS}-1)$ is defined based on a sequence length $M_{sc}^{RS}$.

The base sequence having a length of $3N_{sc}^{RB}$ or more may be defined as follows.

With respect to $M_{sc}^{RS} \ge 3N_{sc}^{RB}$, the base sequence $\bar{r}_{u,v}(0), \ldots, \bar{r}_{u,v}(M_{sc}^{RS}-1)$ is given by the following equation 2.

$$\bar{r}_{u,v}(n) = x_q(n \bmod N_{ZC}^{RS}), 0 \le n < M_{sc}^{RS}, \quad [\text{Equation 2}]$$

where a q-th root Zadoff-Chu sequence may be defined by the following equation 3.

$$x_q(m) = e^{-j\frac{\pi q m(m+1)}{N_{ZC}^{RS}}}, 0 \le m \le N_{ZC}^{RS}-1, \quad [\text{Equation 3}]$$

where q satisfies the following equation 4.

$$q = \lfloor \bar{q}+\frac{1}{2} \rfloor + v \cdot (-1)^{\lfloor 2\bar{q} \rfloor}$$

$$\bar{q} = N_{ZC}^{RS} \cdot (u+1)/31 \quad [\text{Equation 4}]$$

where the length $N_{ZC}^{RS}$ of the Zadoff-Chu sequence is given by the largest prime number, thus satisfying $N_{ZC}^{RS} < M_{sc}^{RS}$.

A base sequence having a length of less than $3N_{sc}^{Rb}$ be defined as follows. First, for $M_{sc}^{RS}=N_{sc}^{RB}$ and $M_{sc}^{RS}=2N_{sc}^{RB}$, the base sequence is given as shown in Equation 5.

$$\bar{r}_{u,v}(n) = e^{j\phi(n)\pi/4}, 0 \le n \le M_{sc}^{RS}-1, \quad [\text{Equation 5}]$$

where values $\phi(n)$ for $M_{sc}^{RS}=N_{sc}^{RB}$ and $M_{sc}^{RS}=2N_{sc}^{RB}$ are given by the following Table 1, respectively.

TABLE 1

| U | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| U | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |

TABLE 2-continued

| U | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

RS hopping is described below.

The sequence group number u in a slot $n_s$ may be defined as shown in the following equation 6 by a group hopping pattern $f_{gh}(n_s)$ and a sequence shift pattern $f_{ss}$.

$$u = (f_{gh}(n_s) + f_{ss}) \bmod 30, \quad \text{[Equation 6]}$$

where mod denotes a modulo operation.

17 different hopping patterns and 30 different sequence shift patterns are present. Sequence group hopping may be enabled or disabled by a parameter for activating group hopping provided by a higher layer.

Although the PUCCH and the PUSCH have the same hopping pattern, the PUCCH and the PUSCH may have different sequence shift patterns.

The group hopping pattern $f_{gh}(n_s)$ is the same for the PUSCH and the PUCCH and is given by the following equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled,} \end{cases} \quad \text{[Equation 7]}$$

where c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The definition of the sequence shift pattern $f_{ss}$ varies between the PUCCH and the PUSCH.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUSCH}$ ss of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

The following is a description of sequence hopping.

Sequence hopping is applied only to an RS having a length of $M_{sc}^{RS} \geq 6N_{sc}^{RB}$.

For an RS having a length of $M_{sc}^{RS} < 6N_{sc}^{RB}$, a base sequence number v within a base sequence group is v=0.

For an RS having a length of $M_{sc}^{RS} \geq 6N_{sc}^{RB}$, a base sequence number v within a base sequence group in a slot $n_s$ is given by the following equation 8.

$$v = \begin{cases} c(n_s) & \text{if group hopping is disabled and} \\ & \text{sequence hopping is enabled} \\ 0 & \text{otherwise,} \end{cases} \quad \text{[Equation 8]}$$

where c(i) denotes a pseudo-random sequence and a parameter for enabling sequence hopping provided by a higher layer determines whether or not sequence hopping is possible. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined in the following manner.

The RS sequence $r^{PUSCH}(\cdot)$ for the PUCCH is defined as $r^{PUSCH}(m \cdot M_{sc}^{RS} + n) = r_{u,v}^{(\alpha)}(n)$. Here, m and n satisfy $$m = 0, 1$$
$$n = 0, \ldots, M_{sc}^{RS} - 1$$

and satisfy $M_{sc}^{RS} = M_{sc}^{PUSCH}$.

A cyclic shift in one slot is given by $\alpha = 2\pi n_{cs}/12$ together with $n_{cs} = (n_{DMRS}^{(1)} + n_{DMRS}^{(2)} + n_{PRS}(n_s)) \bmod 12$ Here, $n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is given by $n_{PRS}(n_s) = \sum_{i=0}^{7} c(8 \cdot n_s + i) \cdot 2^i$.

c(i) is a pseudo-random sequence and c(i) is also a cell-specific value. The pseudo-random sequence generator may be initialized as $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same physical resource block (PRB) set used for the corresponding PUSCH within the sequence that starts at $r^{PUSCH}_{(0)}$. When the sequence is mapped to a resource element (k, l) (l=3 for a normal CP and l=2 for an extended CP) within a subframe, the order of k is first increased and the slot number is then increased.

In summary, a ZC sequence is used along with cyclic extension if the length is greater than or equal to $3N_{sc}^{RB}$ and a computer-generated sequence is used if the length is less than $3N_{sc}^{RB}$. The cyclic shift is determined according to a cell-specific cyclic shift, a UE-specific cyclic shift, a hopping pattern, and the like.

Figure 12A:
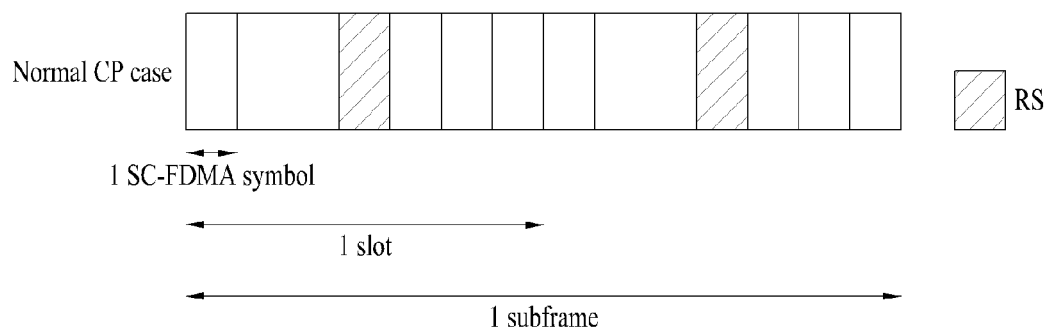
FIG. 12 shows demodulation reference signal (DMRS) structures for a physical uplink shared channel (PUSCH).
Figure 12B:
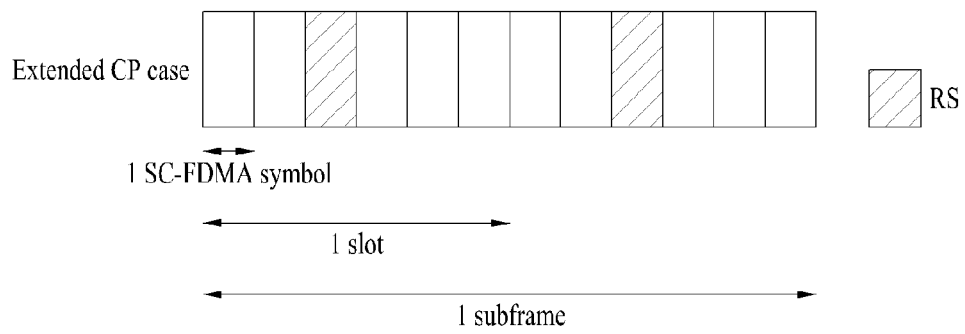

FIG. 12A illustrates the structure of a demodulation reference signal (DMRS) for a PUSCH in the case of normal CP and FIG. 12B illustrates the structure of a DMRS for a PUSCH in the case of extended CP. In the structure of FIG. 12A, a DMRS is transmitted through fourth and eleventh SC-FDMA symbols and, in the structure of FIG. 12B, a DMRS is transmitted through third and ninth SC-FDMA symbols.

FIGS. 13 to 16 illustrate a slot level structure of a PUCCH format. The PUCCH includes the following formats in order to transmit control information.

(1) Format 1: Used for on-off keying (OOK) modulation and scheduling request (SR)

(2) Format 1a and Format 1b: Used for ACK/NACK transmission

1) Format 1a: BPSK ACK/NACK for one codeword

2) Format 1b: QPSK ACK/NACK for two codewords (3) Format 2: Used for QPSK modulation and CQI transmission (4) Format 2a and Format 2b: Used for CQI and ACK/NACK simultaneous transmission.

Table 4 shows a modulation scheme and the number of bits per subframe according to PUCCH format. Table 5 shows the number of RSs per slot according to PUCCH format. Table 6 shows SC-FDMA symbol locations of an RS according to PUCCH format. In Table 4, the PUCCH formats 2a and 2b correspond to the case of normal CP.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol location of RS | |
|---|---|---|
| | Normal CP | Extended CP |
| 1, 1a, 1b | 2, 3, 4 | 2, 3 |
| 2, 2a, 2b | 1, 5 | 3 |

Figure 13:
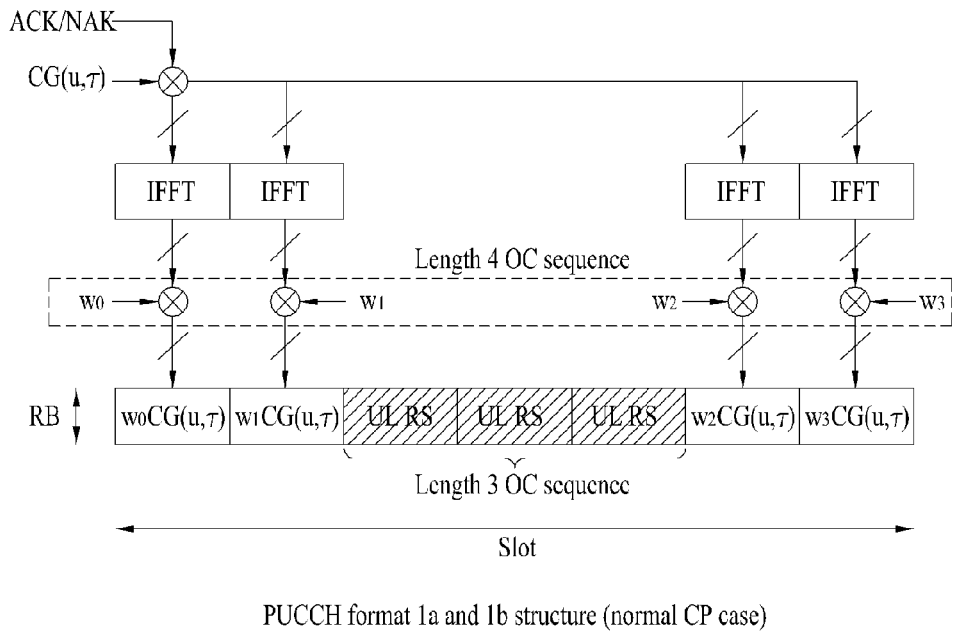
FIGS. 13 and 14 exemplarily show slot level structures of PUCCH formats 1a and 1b.
Figure 14:
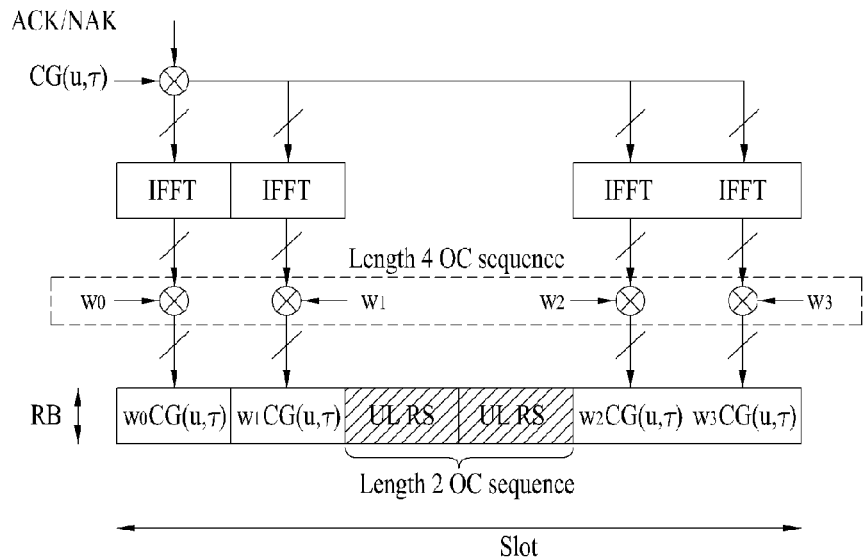

FIG. 13 shows a PUCCH format 1a and 1b structure in the case of a normal CP. FIG. 14 shows a PUCCH format 1a and 1b structure in the case of an extended CP. In the PUCCH format 1a and 1b structure, the same control information is repeated in each slot within a subframe. UEs transmit ACK/NACK signals through different resources that include orthogonal covers or orthogonal cover codes (OCs or OCCs) and different cyclic shifts (i.e., different frequency domain codes) of a Computer-Generated Constant Amplitude Zero Auto Correlation (CG-CAZAC) sequence. For example, the OCs may include orthogonal Walsh/DFT codes. When the number of CSs is 6 and the number of OCs is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of CSs, OCs and PRBs may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Figure 15:
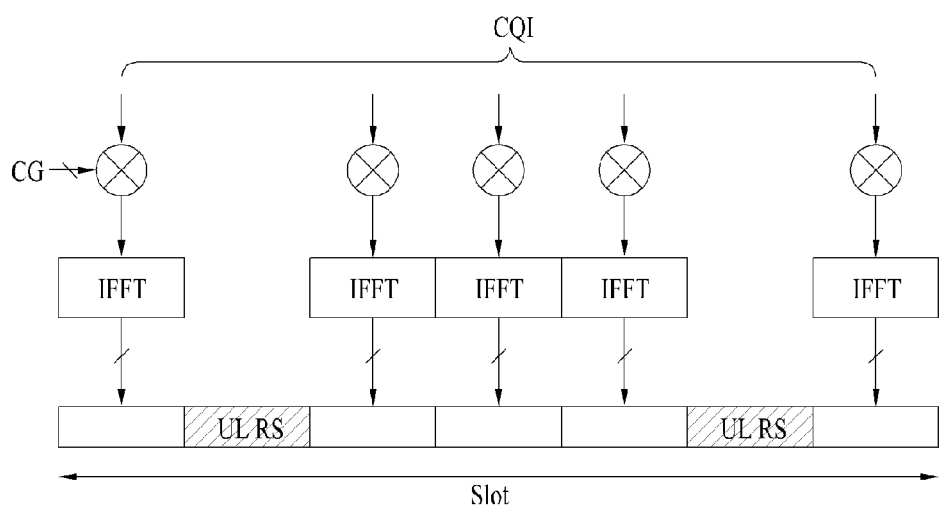
FIGS. 15 and 16 exemplarily show slot level structures of PUCCH formats 2/2a/2b.
Figure 16:
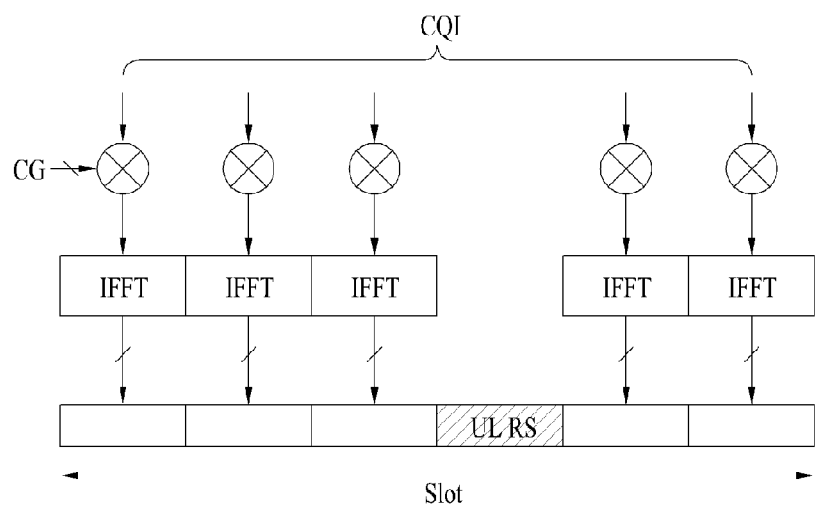

FIG. 15 shows a PUCCH format 2/2a/2b structure in the case of the normal CP. FIG. 16 shows a PUCCH format 2/2a/2b structure in the case of the extended CP. As shown in FIGS. 15 and 16, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

Length-4 and length-3 orthogonal sequences (OCs) for PUCCH formats 1/1a/1bare shown in the following Tables 7 and 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | $[1 \; e^{j2\pi/3} \; e^{j4\pi/3}]$ |
| 2 | $[1 \; e^{j4\pi/3} \; e^{j2\pi/3}]$ |

The orthogonal sequences (OCs) for the RS in the PUCCH formats 1/1a/1b are shown in Table 9.

TABLE 9

| Sequence index $\overline{n}_{oc}(n_s)$ | 1a and 1b | |
|---|---|---|
| | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b when $\Delta_{shift}^{PUCCH}=2$.

Figure 18:
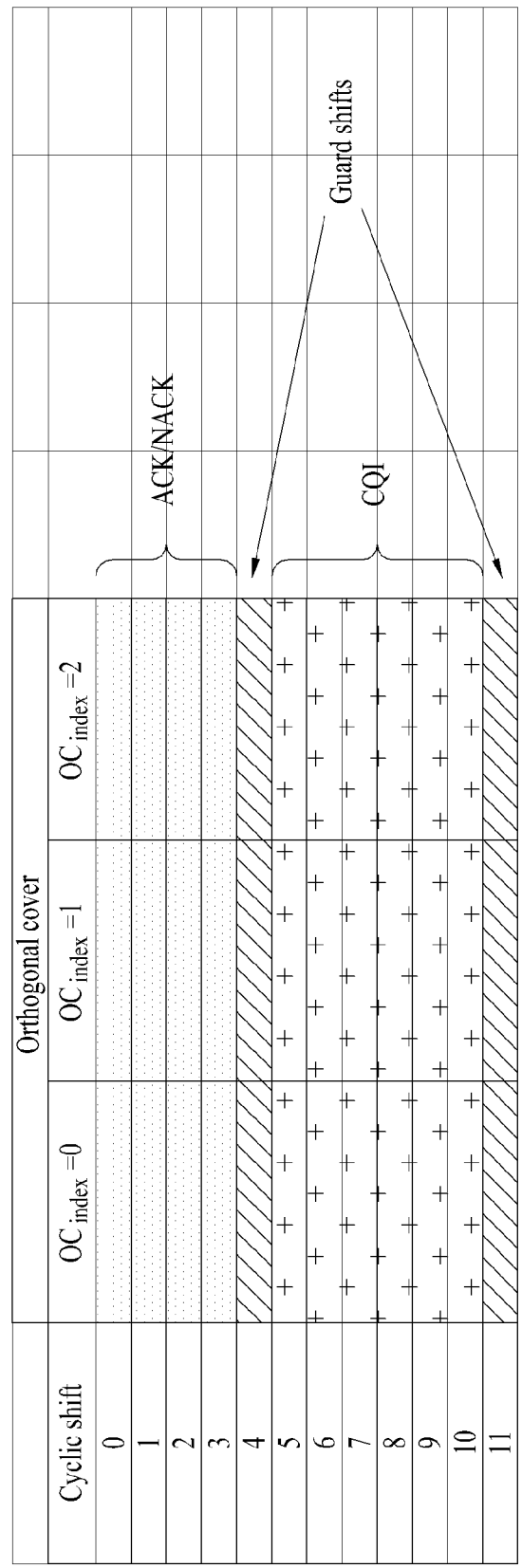
FIG. 18 is a diagram showing channelization of a structure in which PUCCH formats 1/1a/1b and PUCCH formats 2/2a/2b are mixed within the same PRB.

FIG. 18 illustrates channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization
(2) Slot level CS/OC remapping
   1) For inter-cell interference randomization
   2) Slot-based access for mapping between ACK/NACK channels and resources (k)

A resource $n_r$ for PUCCH formats 1/1a/1b includes the following combination.

(1) CS (=DFT OC in a symbol level) ($n_{cs}$)
(2) OC (OC in a slot level) ($n_{oc}$)
(3) Frequency RB ($n_{rb}$)

When indices representing the CS, the OC and the RB are $n_{cs}$, $n_{oc}$ and $n_{rb}$, respectively, a representative index $n_r$ includes $n_{cs}$, $n_{oc}$ and $n_{rb}$. That is, $n_r=(n_{cs}, n_{oc}, n_{rb})$.

A CQI, a PMI, an RI, and a combination of a CQI and an ACK/NACK may be transmitted through PUCCH formats 2/2a/2b. Here, Reed Muller (RM) channel coding may be applied.

For example, in the LTE system, channel coding for a UL CQI is described as follows. A bit stream $a_0, a_1, a_2, a_3, \ldots, a_{A-1}$ is channel-coded using a (20, A) RM code. Table 10 shows a base sequence for the (20, A) code. $a_0$ and $a_{A-1}$ represent a Most Significant Bit (MSB) and a Least Significant Bit (LSB), respectively. In the extended CP case, the maximum number of information bits is 11, except when the CQI and the ACK/NACK are simultaneously transmitted. After the bit stream is coded into 20 bits using the RM code, QPSK modulation may be applied to the encoded bits. Before QPSK modulation, the encoded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 0 | 1 | 0 | 1 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2, \quad \text{[Equation 9]}$$

where $i=0, 1, 2, \ldots, B-1$.

Table 11 shows an uplink control information (UCI) field for broadband reporting (single antenna port, transmit diversity or open loop spatial multiplexing PDSCH) CQI feedback.

TABLE 11

| Field | Bandwidth |
|---|---|
| Wideband CQI | 4 |

Table 12 shows a UCI field for wideband CQI and PMI feedback. The field reports closed loop spatial multiplexing PDSCH transmission.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband reporting.

TABLE 13

| | Bit widths | | |
|---|---|---|---|
| | | 4 antenna ports | |
| Field | 2 antenna ports | Up to two layers | Up to four layers |
| RI (Rank Indication) | 1 | 1 | 2 |

Figure 19:
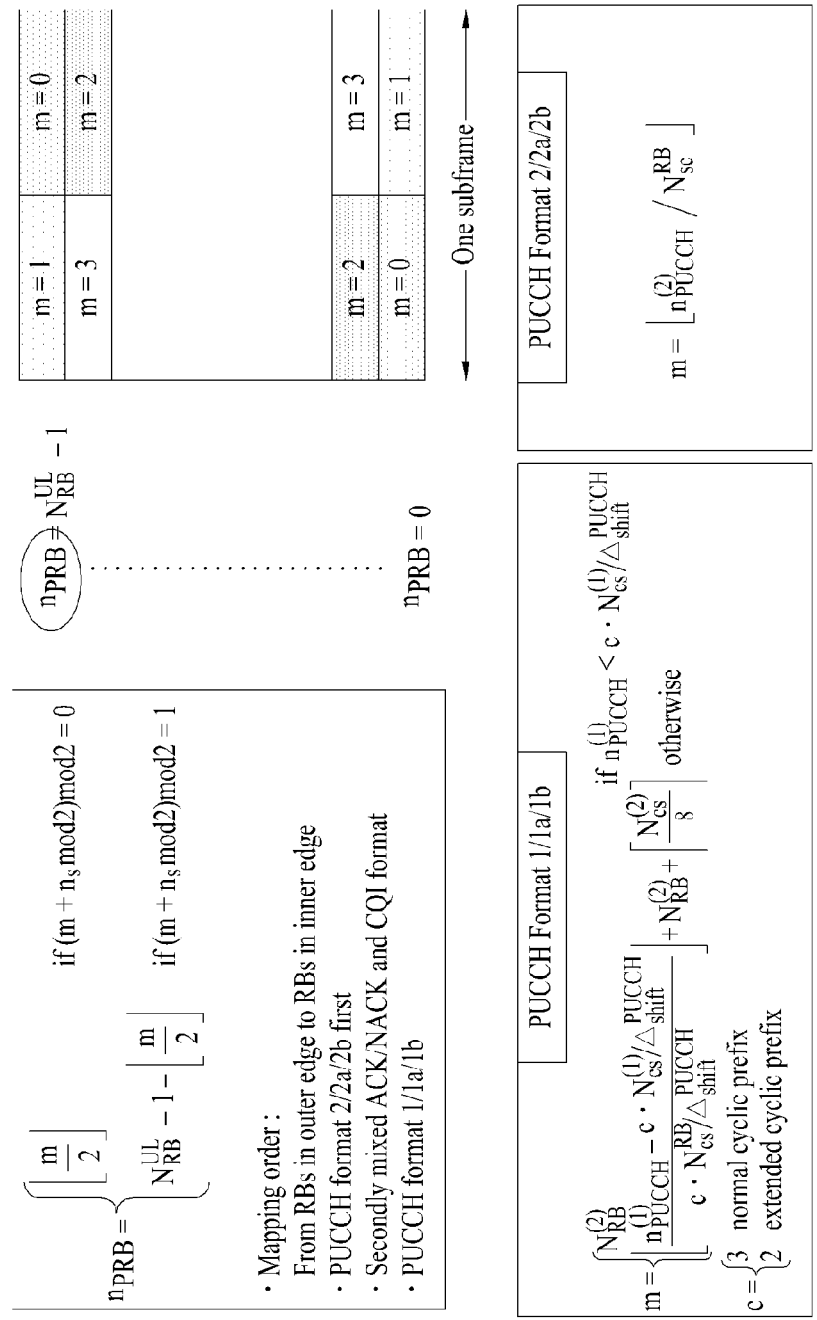
FIG. 19 is a diagram showing allocation of a physical resource allocation (PRB) used to transmit a PUCCH.

FIG. 19 shows PRB allocation. As shown in FIG. 19, the PRB may be used for PUCCH transmission in slot $n_s$.

The term "multi-carrier system" or "carrier aggregation system" refers to a system for aggregating and utilizing a plurality of carriers having a bandwidth smaller than a target bandwidth for broadband support. When a plurality of carriers having a bandwidth smaller than a target bandwidth is aggregated, the bandwidth of the aggregated carriers may be limited to a bandwidth used in the existing system for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support carrier aggregation. The term "multi-carrier" may be used interchangeably with the terms "carrier aggregation" and "bandwidth aggregation". The term "carrier aggregation" may refer to both contiguous carrier aggregation and non-contiguous carrier aggregation.

Figure 20:
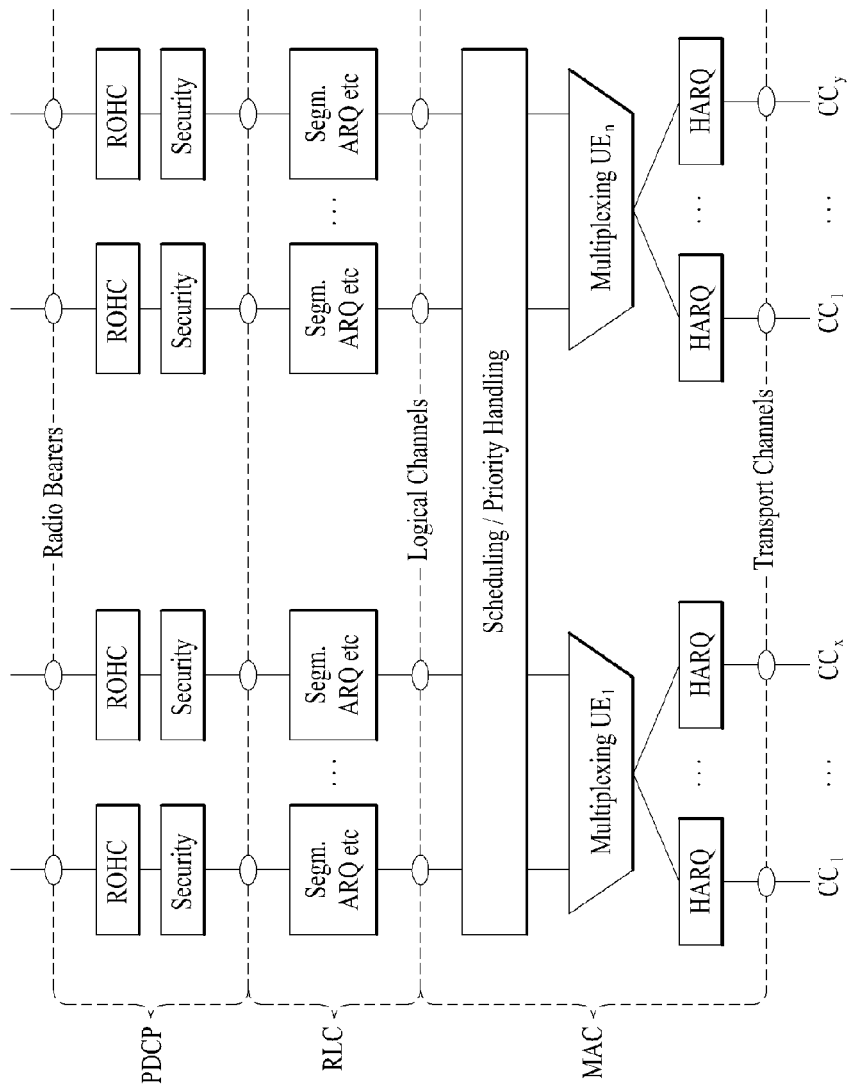
FIG. 20 is a conceptual diagram of management of a downlink component carrier (DL CC) in a base station (BS).
Figure 21:
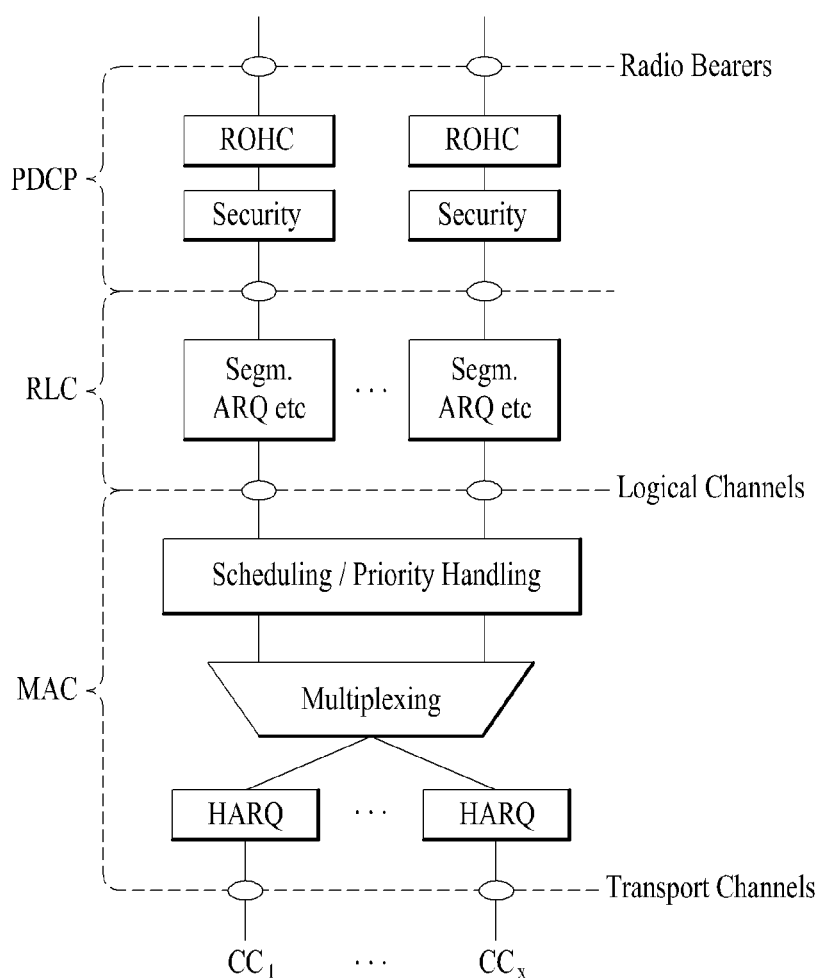
FIG. 21 is a conceptual diagram of management of an uplink component carrier (UL CC) in a user equipment (UE).

FIG. 20 is a conceptual diagram illustrating management of downlink component carriers (DL CCs) in a base station (BS) and FIG. 21 is a conceptual diagram illustrating management of uplink component carriers (UL CCs) in a user equipment (UE). For ease of explanation, the higher layer is simply described as a MAC (or a MAC entity) in the following description of FIGS. 20 and 21.

Figure 22:
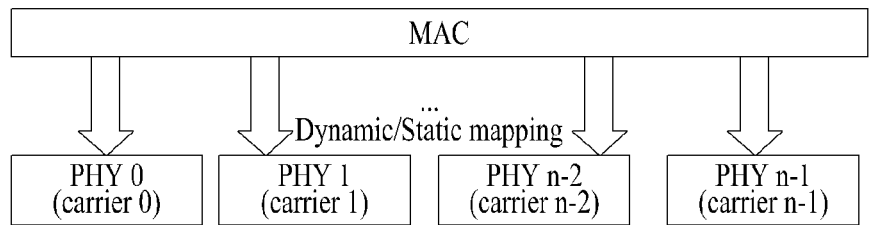
FIG. 22 is a conceptual diagram of the case where one MAC layer manages multiple carriers in a BS.
Figure 23:
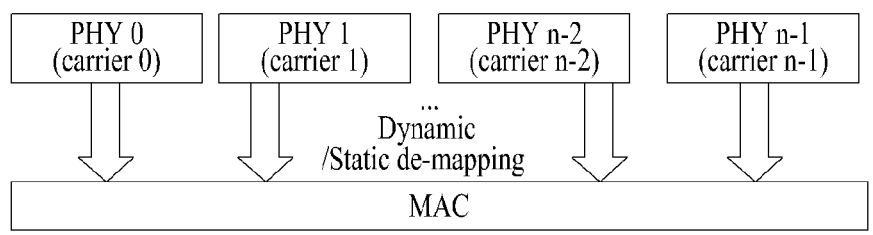
FIG. 23 is a conceptual diagram of the case where one MAC layer manages multiple carriers in a UE.

FIG. 22 is a conceptual diagram illustrating management of multiple carriers by one MAC entity in a BS. FIG. 23 is a conceptual diagram illustrating management of multiple carriers by one MAC entity in a UE.

As shown in FIGS. 22 and 23, one MAC manages and operates one or more frequency carriers to perform transmission and reception. Frequency carriers managed by one MAC need not be contiguous and as such they are more flexible in terms of resource management. In FIGS. 22 and 23, it is assumed that one PHY (or PHY entity) corresponds to one component carrier (CC) for ease of explanation. One PHY does not always indicate an independent radio frequency (RF) device. Although one independent RF device generally corresponds to one PHY, the present invention is not limited thereto and one RF device may include a plurality of PHYs.

Figure 24:
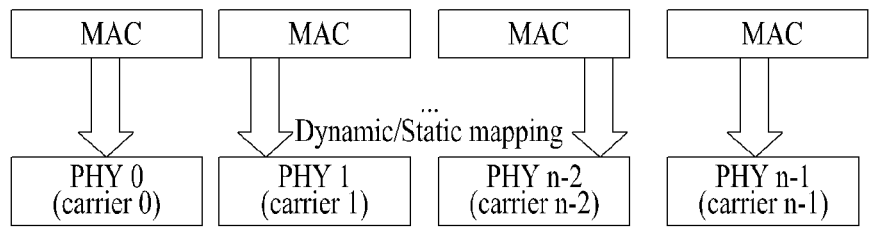
FIG. 24 is a conceptual diagram of the case where one MAC layer manages multiple carriers in a BS.
Figure 25:
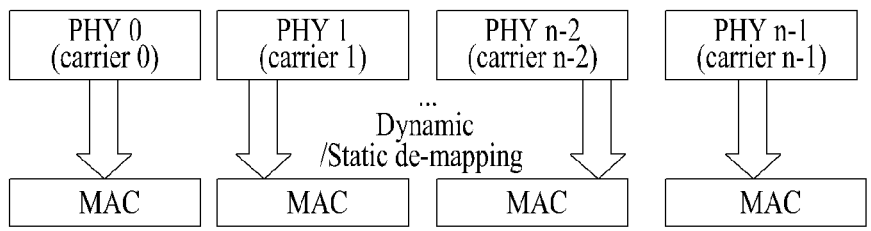
FIG. 25 is a conceptual diagram of the case where a plurality of MAC layers manages multiple carriers in a UE.
Figure 26:
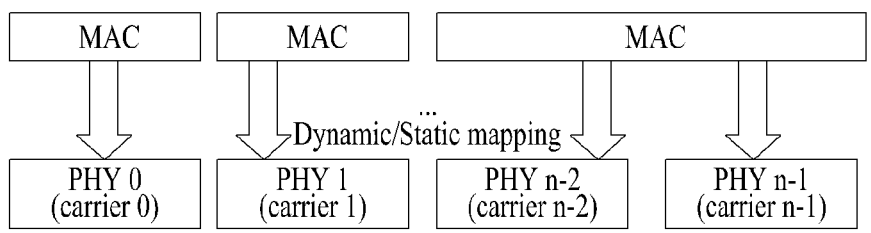
FIG. 26 is a conceptual diagram of the case where a plurality of MAC layers manages multiple carriers in a BS according to one embodiment of the present invention.
Figure 27:
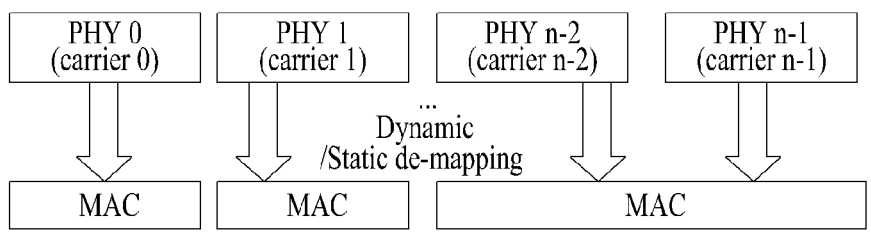
FIG. 27 is a conceptual diagram of the case where a plurality of MAC layers manages multiple carriers from the viewpoint of UE reception according to another embodiment of the present invention.

FIG. 24 is a conceptual diagram illustrating management of multiple carriers by a plurality of MAC entities in a BS. FIG. 25 is a conceptual diagram illustrating management of multiple carriers by a plurality of MAC entities in a UE. FIG. 26 illustrates another scheme of management of multiple carriers by a plurality of MAC entities in a BS. FIG. 27 illustrates another scheme of management of multiple carriers by a plurality of MAC entities in a UE.

Unlike the structures of FIGS. 22 and 23, a number of carriers may be controlled by a number of MAC entities rather than by one MAC as shown in FIGS. 24 to 27.

As shown in FIGS. 24 and 25, carriers may be controlled by MACs on a one to one basis. As shown in FIGS. 26 and 27, some carriers may be controlled by MACs on a one to one basis and one or more remaining carriers may be controlled by one MAC.

The above-mentioned system includes a plurality of carriers (i.e., 1 to N carriers) and carriers may be used so as to be contiguous or non-contiguous to each other. This scheme may be equally applied to UL and DL. The TDD system is constructed so as to manage N carriers, each including downlink and uplink transmission, and the FDD system is constructed such that multiple carriers are applied to each of uplink and downlink. The FDD system may also support asymmetrical carrier aggregation in which the numbers of carriers aggregated in uplink and downlink and/or the bandwidths of carriers in uplink and downlink are different.

When the number of component carriers (CCs) aggregated in uplink (UL) is identical to the number of CCs aggregated in downlink (DL), all CCs may be configured so as to be compatible with the conventional system. However, this does not mean that CCs that are configured without taking into consideration such compatibility are excluded from the present invention.

Hereinafter, it is assumed for ease of explanation description that, when a PDCCH is transmitted through DL component carrier #0, a PDSCH corresponding to the PDCCH is transmitted through DL component carrier #0. However, it is apparent that cross-carrier scheduling may be applied such that the PDSCH is transmitted through a different DL component carrier. The term "component carrier" may be replaced with other equivalent terms (e.g., cell).

Figure 28:
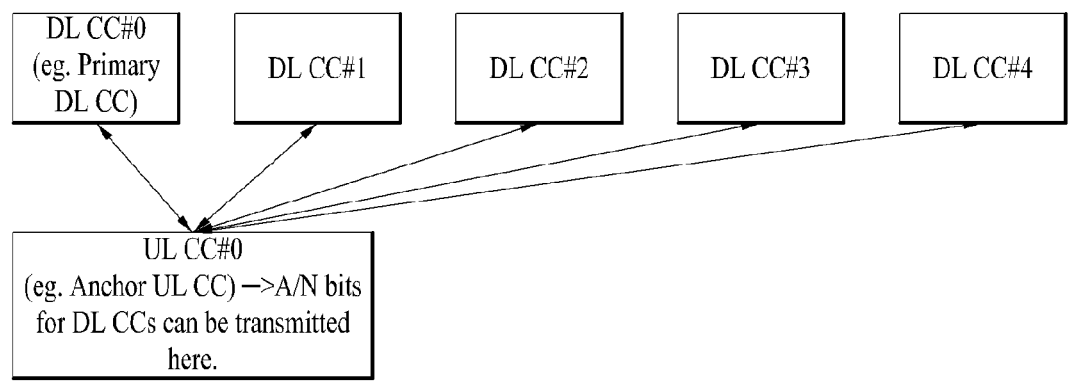
FIG. 28 is a diagram showing asymmetric carrier aggregation (CA) in which a plurality of downlink component carriers (DL CCs) and one uplink CC are linked.

FIG. 28 shows a scenario in which uplink control information (UCI) is transmitted in a radio communication system supporting carrier aggregation (CA). For ease of explanation, it is assumed in this example that the UCI is ACK/NACK (A/N). However, the UCI may include control information such as channel state information (CSI) (e.g., CQI, PMI, RI, etc.) or scheduling request information (e.g., SR, etc.).

FIG. 28 shows asymmetric carrier aggregation in which 5 DL CCs and one UL CC are linked. The illustrated asymmetric carrier aggregation may be set from the viewpoint of UCI transmission. That is, a DL CC-UL CC linkage for UCI and a DL CC-UL CC linkage for data may be set differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits ($=5^5=3125=11.61$ bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs. DL CC may also be referred to as DL Cell, and UL CC may also be referred to as UL Cell. In addition, the anchor DL CC may also be referred to as DL PCell, and the anchor UL CC may also be referred to as UL PCell.

A DL primary CC may be defined as a DL CC linked with a UL primary CC. Here, linkage includes implicit and explicit linkage. In LTE, one DL CC and one UL CC are uniquely paired. For example, a DL CC that is linked with a UL primary CC by LTE pairing may be referred to as a DL primary CC. This may be regarded as implicit linkage. Explicit linkage indicates that a network configures the linkage in advance and may be signaled by RRC or the like. In explicit linkage, a DL CC that is paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. The DL primary CC may also be configured through higher layer signaling. The DL primary CC may be a DL CC in which a UE performs initial access. DL CCs other than the DL primary CC may be referred to as DL secondary CCs. Similarly, UL CCs other than the UL primary CC may be referred to as UL secondary CCs.

DL-UL may correspond only to FDD. DL-UL pairing may not be defined for TDD since TDD uses the same frequency. In addition, a DL-UL linkage may be determined from a UL linkage through UL E-UTRA Absolute Radio Frequency Channel Number (EARFCN) of SIB2. For example, the DL-UL linkage may be acquired through SIB2 decoding when initial access is performed and may be acquired through RRC signaling otherwise. Accordingly, only the SIB2 linkage may be present and other DL-UL pairing may not be defined. For example, in the 5DL:1UL structure of FIG. 28, DL CC #0 and UL CC #0 may be in an SIB2 linkage relation with each other and other DL CCs may be in an SIB2 linkage relation with other UL CCs which have not been set for the UE.

Embodiment: PUCCH Format Adaptation

In order to transmit the increased UCI, the following PUCCH formats have been proposed in 3GPP. For convenience of description, the following PUCCH format is referred to as Carrier Aggregation (CA) PUCCH format. The CA PUCCH format is disclosed only for illustrative purposes, and the following PUCCH formats are not limited to CA. For example, the CA PUCCH format may include, without limitation, PUCCH formats used for transmitting the increased UCI, in a situation that the amount of UCI information increases due to relay communication and TDD.

1. Channel Selection

A specific resource is selected from a plurality of resources defined for RS+UCI, and a UCI modulation value is transmitted through the selected resource. Table 14 exemplarily shows the mapping table when 3-bit ACK/NACK information is transmitted using channel selection. Herein, QPSK modulation may be used.

TABLE 14

| ACK/NACK | Ch1 | | Ch2 | |
|---|---|---|---|---|
| | RS | UCI | RS | UCI |
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

In Table 14, Ch1 and Ch2 represent PUCCH resources reserved for ACK/NACK transmission. 1, −1, j, and −j represent QPSK modulation values.

2. Enhanced Channel Selection

A resource for the RS part and a resource for the UCI part are separately selected from a plurality of resources defined for RS+UCI, and a UCI modulation value is transmitted through the selected resources. Table 15 exemplarily shows the mapping table when 3-bit ACK/NACK information is transmitted using channel selection. Herein, QPSK modulation may be used.

TABLE 15

| ACK/NACK | Ch1 | | Ch2 | |
|---|---|---|---|---|
| | RS | UCI | RS | UCI |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Table 15, Ch1 and Ch2 represent PUCCH resources reserved for ACK/NACK transmission. 1 and −1 represent BPSK modulation values.

3. Spreading Factor (SF) Reduction

Figure 29:
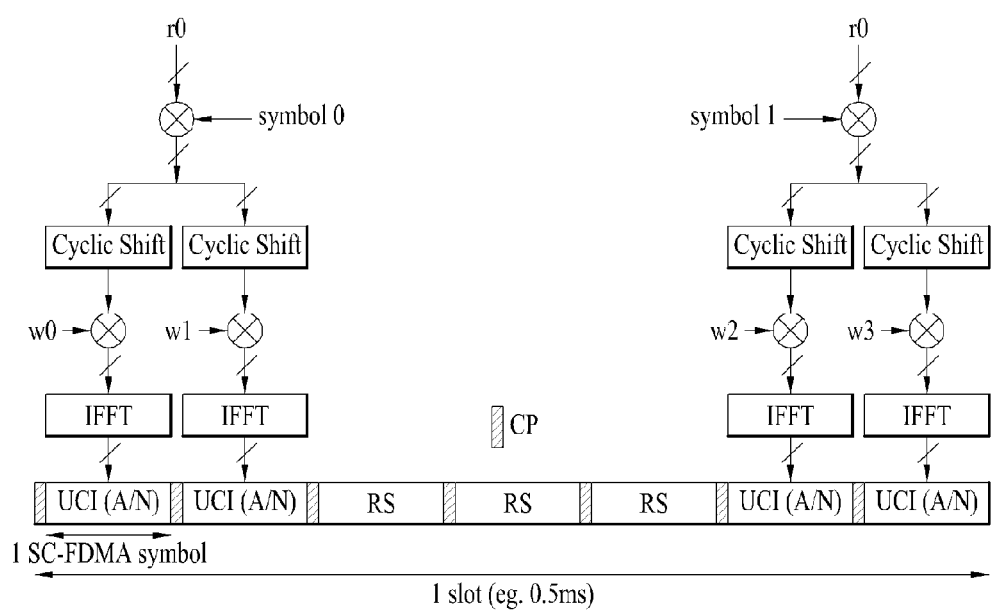
FIGS. 29 to 31 are conceptual diagrams illustrating CA PUCCH format according to one embodiment of the present invention.

FIG. 29 exemplarily shows a PUCCH format for transmitting a UCI using SF reduction and signal processing for the PUCCH format. Basic procedures of FIG. 29 are identical to those of FIGS. 13 and 14. However, an SF value used in LTE PUCCH formats 1/1a/1b is reduced from 4 to 2 so that much more modulation symbols (Symbol 0, Symbol 1) can be transmitted. The number of UCI/RS symbols, the location thereof, etc. can be freely modified according to a system design.

4. Channel Selection with SF2

The "Channel selection with SF2" method is achieved by combining the above channel selection and the above SF reduction. Table 16 exemplarily shows the mapping table when 4-bit ACK/NACK information is transmitted using "channel selection+SF=2". Herein, QPSK modulation may be used.

TABLE 16

| ACK/NACK | Ch 1 | | | Ch 2 | | |
|---|---|---|---|---|---|---|
| | RS | UCI 1 | UCI 2 | RS | UCI 1 | UCI 2 |
| N,N,N,N | 1 | 1 | 1 | 0 | 0 | 0 |
| N,N,N,A | 1 | 1 | −j | 0 | 0 | 0 |

TABLE 16-continued

| ACK/NACK | Ch 1 | | | Ch 2 | | |
|---|---|---|---|---|---|---|
| | RS | UCI 1 | UCI 2 | RS | UCI 1 | UCI 2 |
| N,N,A,N | 1 | 1 | j | 0 | 0 | 0 |
| N,N,A,A | 1 | 1 | −1 | 0 | 0 | 0 |
| N,A,N,N | 1 | −1 | 1 | 0 | 0 | 0 |
| N,A,N,A | 1 | −1 | −j | 0 | 0 | 0 |
| N,A,A,N | 1 | −1 | j | 0 | 0 | 0 |
| N,A,A,A | 1 | −1 | −1 | 0 | 0 | 0 |
| A,N,N,N | 0 | 0 | 0 | 1 | 1 | 1 |
| A,N,N,A | 0 | 0 | 0 | 1 | 1 | −j |
| A,N,A,N | 0 | 0 | 0 | 1 | 1 | j |
| A,N,A,A | 0 | 0 | 0 | 1 | 1 | −1 |
| A,A,N,N | 0 | 0 | 0 | 1 | −1 | 1 |
| A,A,N,A | 0 | 0 | 0 | 1 | −1 | −j |
| A,A,A,N | 0 | 0 | 0 | 1 | −1 | j |
| A,A,A,A | 0 | 0 | 0 | 1 | −1 | −1 |

In Table 16, Ch1 and Ch2 represent PUCCH resources reserved for ACK/NACK transmission. 1, −1, j, and −j represent QPSK modulation values.

5. PUCCH Format 2

In case of PUCCH format 2, data or information can be transmitted using legacy LTE PUCCH format 2. LTE PUCCH format 2 supports information of a maximum of 11 to 13 bits.

6. DFT-s-OFDMA Using Time Domain CDM

Figure 30:
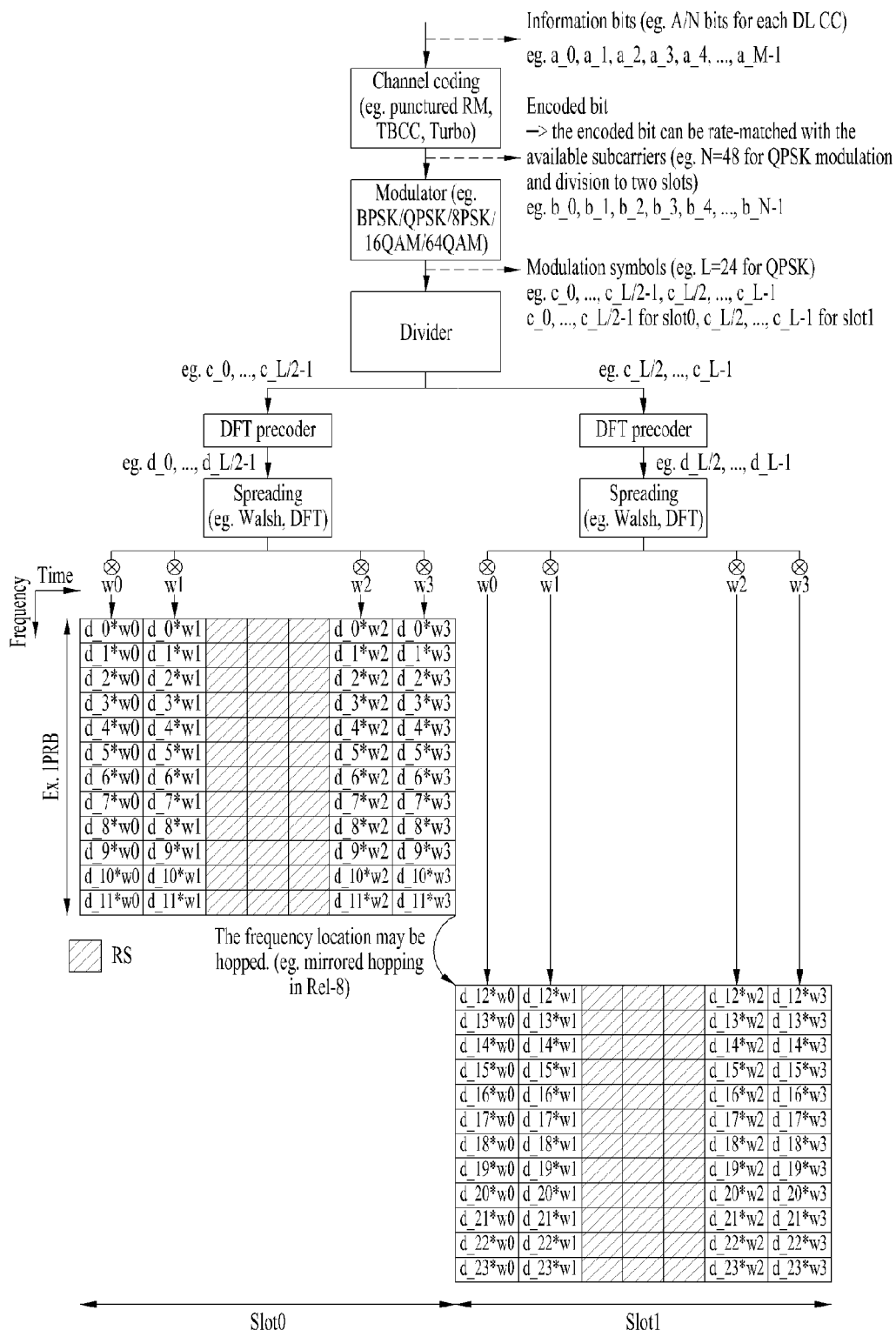

FIG. 30 exemplarily shows a PUCCH format for transmitting UCI using DFT-s-OFDMA and a time domain CDM, and signal processing for the PUCCH format. The number of UCI/RS symbols, the location thereof, etc. can be freely modified according to a system design.

Referring to FIG. 30, the channel coding and rate matching block performs channel coding of information bits (a_0, a_1, . . . , a_M−1) (e.g., multiple ACK/NACK bits), such that it can generates the encoded bits (coded bits or coding bits) (or codewords) b_0, b_1, . . . , b_N−1. M is the size of information bits, and N is the size of coded bits. The information bits may include uplink control information (UCI), for example, multiple ACK/NACK information for multiple data (or PDSCH) received through a plurality of DL CCs. In this case, the information bits (a_0, a_1, . . . , a_M−1) are joint-coded irrespective of kinds/numbers/sizes of UCIs constructing the information bits. For example, if the information bits include multiple ACK/NACK data of several DL CCs, channel coding is not performed per DL CC or per ACK/NACK bit, but is performed for the entire bit information, such that a single codeword is generated. Channel coding is not limited thereto, and includes simple repetition, simplex coding, Reed Muller (RM) coding, punctured RM coding, Tail-biting convolutional coding (TBCC), low-density parity-check (LDPC) or turbo-coding.

Although not shown in the drawings, the coding bit may be rate-matched in consideration of a modulation order and the amount of resources. The rate matching function may be contained in the channel coding block, or may be performed through a separate functional block. For example, the channel coding block obtains a single codebook by performing (32,0) RM coding onto a plurality of control information, and cyclic buffer rate-matching for the obtained codebook can be performed.

The modulator modulates the encoded bits (b_0, b_1, . . . , b_N−1) so as to generate the modulation symbols (c_0, c_1, . . . , c_L−1). L is the size of a modulation symbol. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols (c_0, c_1, . . . , c_L−1) to individual slots. The order/pattern/scheme for distributing the modulation symbols to individual slots is not specifically limited. For example, the divider may sequentially distribute the modulation symbols to individual slots on the basis of the front part of the modulation symbols. In this case, as shown in the drawings, the modulation symbols (c_0, c_1, . . . , c_L/2−1) are distributed to Slot 0 and the modulation symbols (c_L/2, c_L/2+1, . . . , c_L−1) may be distributed to Slot 1. In addition, the modulation symbols may be interleaved (or permuted) while being distributed to individual slots. For example, the even-th modulation symbols may be distributed to Slot 1, and the odd-th modulation symbols may be distributed to Slot 1. If necessary, the modulation process and the division process may be replaced with each other in order.

The DFT precoder performs DFT precoding (e.g., 12-point DFT) for the modulation symbols distributed to individual slots so as to generate a single carrier waveform. Referring to the drawings, the modulation symbols (c_0, c_1, . . . , c_L/2−1) distributed to Slot 0 may be DFT-precoded to DFT symbols (d_0, d_1, . . . , d_L/2−1), and the modulation symbols (c_L/2, c_L/2+1, . . . , c_L−1) distributed to Slot 1 may be DFT-precoded to DFT symbols (d_L/2, d_L/2+1, . . . , d_L−1). The DFT precoding may be replaced with another linear operation (e.g., Walsh precoding).

The spreading block performs (time domain) spreading of the DFT-processed signal at the SC-FDMA symbol level. The time domain spreading at the SC-FDMA symbol level may be performed using the spreading code (sequence). The spreading code may include a quasi-orthogonal code and an orthogonal code. The quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a quasi-orthogonal code. A maximum value of the spreading code size (or the spreading factor (SF)) is limited by the number of SC-FDMA symbols used for control information transmission. For example, if four SC-FDMA symbols are used to transmit control information in one slot, (quasi-)orthogonal codes (w0, w1, w2, w3) each having a length of 4 may be used in each slot. SF means the spreading degree of control information, and may be relevant to the UE multiplexing order or antenna multiplexing order. SF may be changed according to system requirements, for example, in the order of 1→2→3→4, . . . . The SF may be pre-defined between the BS and the UE, or may be transferred to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

The signal processing of FIG. 30 is disclosed only for illustrative purposes, and signals mapped to PRB of FIG. 30 can be obtained through various equivalent signal processing steps. For example, the order of processing of the DFT precoder and the spreading block may be changed, and the divider and the spreading block may be implemented as a single functional block.

7. PUCCH Format 2 Using Multi-Sequence Modulation (MSM)

Figure 31:
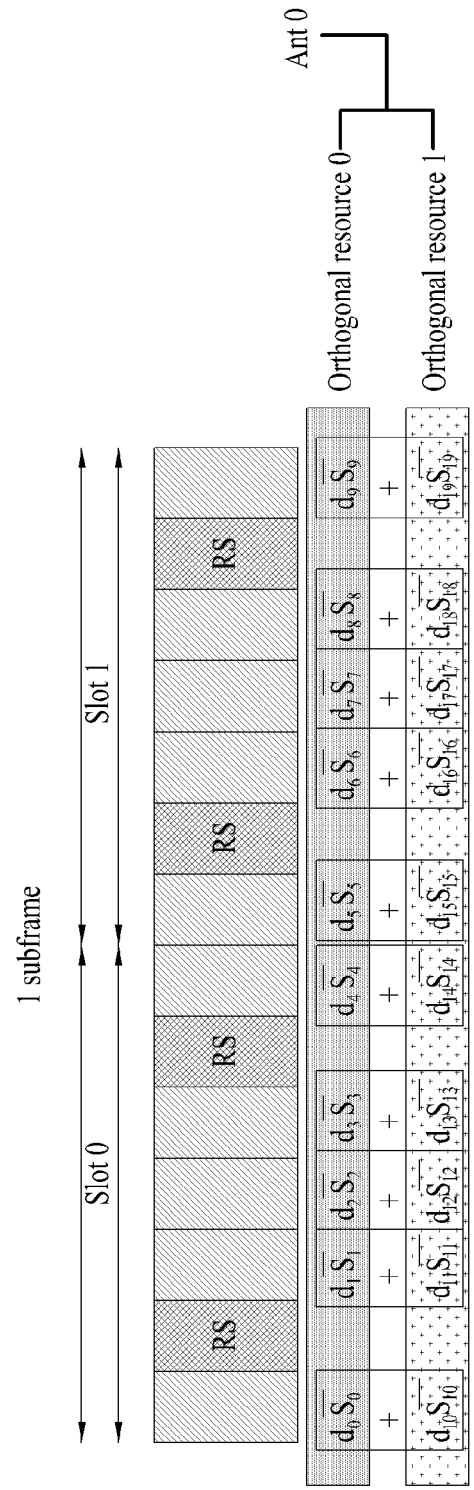

FIG. 31 exemplarily shows a PUCCH format for transmitting a UCI using PUCCH format 2 and MSM, and signal processing for the PUCCH format 2. MSM denotes a method of allocating N PUCCH resources and performing modulation (e.g., QPSK, 8PSK, M-ary QAM, etc.) to each resource. In FIG. 31, $d_i$ (i=0, 1, ..., 19) denotes symbols that are channel-coded and QPSK-modulated. A total number of QPSK modulation symbols in two slots is 10, and a total of 20 QPSK modulation symbols can be mapped to two antennas (or two antenna ports). $\bar{s}_j$ (j=0, 1, ..., 19) is a vector indicating a sequence [for example, a computer sequence (including cyclic shift application)] mapped to subcarriers in one RB, and has a length corresponding to the number (e.g., 12) of subcarriers in one RB. Referring to FIG. 31, a symbol space is extended using two orthogonal PUCCH resources and UCI can be transmitted through the extended symbol space. In order to prevent a CM from increasing, two PUCCH resources may be present in the same PRB. In order to further minimize CM increase, two orthogonal resources may use the same PRB index and the same OC index, and may also utilize different cyclic shifts. That is, MSM can be performed by changing only a cyclic shift to another. Especially, the cyclic shift may be a contiguous value or a specific value spaced apart by a predetermined value $\Delta_{shift}^{PUCCH}$. As can be seen from the structure shown in FIG. 31, assuming that the coding rate is 1 and QPSK modulation is used, it can be recognized that information of a maximum of 40 bits can be transmitted.

Cases (or events) that at least two kinds of UCI or UCI/SRS are transmitted over PUCCH in LTE, UCI combinations are generally classified as follows.

SR+ACK/NACK
CQI+ACK/NACK
SR+CQI
SR+CQI+ACK/NACK
Transmission in a subframe in which at least one of the above UCIs and the SRS are configured.

A UCI transmission scheme for preventing system throughput from being deteriorated during transmission of multiple UCIs will hereinafter be described in detail. In more detail, the present invention proposes a method for adapting a CA PUCCH format at the corresponding event so as to transmit multiple UCIs. In more detail, the operation for adapting a PUCCH format may be performed using the number of DL CCs or the number of information bits configured for the corresponding UE as a threshold value. In addition, information related to the PUCCH format adaptation may be transmitted in a UE specific way through a higher layer signaling (e.g., RRC or MAC). Information related to PUCCH format adaptation may indicate information related to a set of PUCCH formats capable of being selected by the UE, or may indicate a specific PUCCH format to be used (or changed) by the UE. As a result, when a UCI simultaneous transmission event occurs, UCI contents can be matched with the PUCCH transmission format. If a multiple-UCI transmission event has occurred in a subframe on which the SRS is configured, the embodiment of the present invention can be applied to the shortened PUCCH format without change.

The following drawings and embodiments are focused upon a specific case in which a UCI/RS symbol structure of the legacy LTE PUCCH format 1 or 2 (normal CP) is used as a UCI/RS symbol structure of a subframe or slot level applied to CA PUCCH format. However, the above-mentioned subframe/slot-level UCI/RS symbol structure for use in the CA PUCCH format is defined only for illustrative purposes, and the scope or spirit of the present invention is not limited to a specific structure and can be applied to other examples. In accordance with the PUCCH format of the present invention, the number of UCI/RS symbols, the location thereof, etc. can be freely modified according to a system design.

For convenience of description, the embodiment of the present invention is focused upon simultaneous transmission (event) of CQI+ACK/NACK. It is assumed that CQI relates to each DL CC and ACK/NACK includes multiple ACK/NACK associated with multiple DL CCs. The example of simultaneously transmission of CQI+ACK/NACK is disclosed only for illustrative purposes, and it should be noted that the present invention can also be equally or similarly applied to SR+ACK/NACK, SR+CQI, and SR+CQI+ACK/NACK.

As an example of PUCCH format adaptation, a plurality of UCIs (e.g., CQI+ACK/NACK) can be transmitted through the above joint-coded CA PUCCH format at a specific time where a UCI simultaneous transmission event occurs. In accordance with the LTE technology, in case of CQI, information of a maximum of 11 bits needs to be transmitted for a single DL CC. Considering carrier aggregation (CA), ACK/NACK information of a maximum of 10 bits (or 12 bits) needs to be transmitted on the basis of 5 DL CCs. Therefore, information of a total of 21 bits needs to be transmitted in order to perform simultaneous transmission through joint coding. In case of CQI+ACK/NACK, the following two examples may be used.

In the first example, if ACK/NACK is fed back through PUCCH format 2, joint coding may be carried out through PUCCH format 2 using MSM at the corresponding event. In this case, information bit streams for each of CQI and ACK/NACK may be located at a predetermined location. For example, when performing channel coding based on RM coding, the front part of a basis sequence has higher reliability so that ACK/NACK information, which is more important, may be located at the front part of the basis sequence, and CQI may be located at the rear part of the basis sequence. The same principle can also be applied to other coding methods. PUCCH resources for the MSM format may be indicated, predetermined, or predefined through higher layer signaling or DCI.

In the second example, if ACK/NACK is fed back through (enhanced) channel selection based on PUCCH formats 1/1a/1b, joint-coded information can be fed back through MSM-based PUCCH format 2 or DFT-s-OFDMA format at the corresponding event. In this case, information bit streams for each of CQI and ACK/NACK may be located at a predetermined location. For example, when performing channel coding based on RM coding, the front part of a basis sequence has higher reliability so that ACK/NACK information, which is more important, may be located at the front part of the basis sequence, and CQI may be located at the rear part of the basis sequence. The same principle can also be applied to other coding methods. PUCCH resources for MSM format or DFT-s-OFDMA may be indicated, predetermined, or predefined through higher layer signaling or DCI.

Although the above-mentioned example has disclosed MSM-based PUCCH format 2 or DFT-s-OFDMA format as an example of the PUCCH format adaptation, it should be noted that the MSM-based PUCCH format 2 or the DFT-s-OFDMA format may be replaced with an arbitrary CA PUCH format capable of transmitting joint-coded information.

Meanwhile, assuming that (enhanced) channel selection or PUCCH format 2 is used as CA PUCCH, it is impossible to transmit information through joint coding at the corresponding event. In this case, if an event for transmitting multiple UCIs occurs, some UCIs may be dropped. For example, assuming that a base station (BS) configures CA PUCCH format using (enhanced) channel selection or PUCCH format 2, if a simultaneous transmission event of CQI+ACK/NACK occurs, CQI may be dropped by assigning priority over ACK/NACK. In case of SR+CQI+ACK/NACK, only CQI may be dropped and SR+ACK/NACK may be transmitted.

Figure 32:
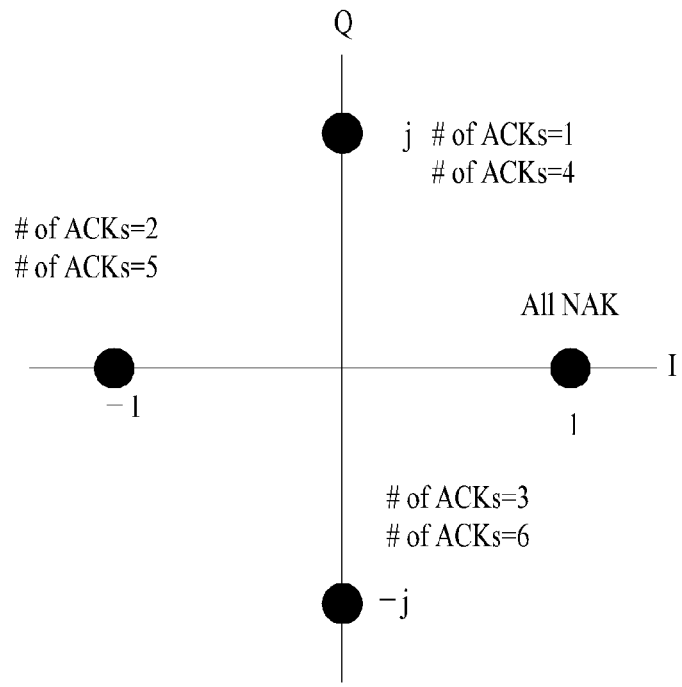
FIGS. 32 and 33 are conceptual diagrams illustrating QPSK constellation mapping according to one embodiment of the present invention.

FIG. 32 is a conceptual diagram illustrating a method for simultaneously transmitting SR+UCI (e.g., SR+ACK/NACK). The simultaneous transmission of SR+UCI may be achieved when other UCI transmission is triggered at a subframe where SR transmission is triggered. In this case, since other UCI (e.g., ACK/NACK) information is converted into an SR format and transmitted, simultaneous transmission of SR+UCI can be achieved. That is, if SR is positive, another UCI may be converted into an SR format and transmitted.

Referring to FIG. 32, if the ACK/NACK result of multiple DL CCs is NACK in case of SR+ACK/NACK transmission, information regarding the number of NACK signals is loaded on SR resources and then transmitted. In addition, if at least one ACK/NACK result of multiple DL CCs is ACK, information regarding the number of ACK signal is loaded on SR resources and then transmitted. Here, NACK may include not only a case in which downlink data fails to decode but also a case in which discontinuous transmission (DTX) occurs. DTX occurrence may be inferred from counter information contained in a PDCCH for downlink scheduling. Counter information may indicate an order of a scheduled PDCCH (or PDSCH) or a total number of scheduled PDCHs (or PDSCHs).

In more detail, the ACK/NACK responses of multiple DL CCs are all NACK, a QPSK modulation value of 1 is loaded to SR resources and then transmitted. In contrast, if the number of ACKs is 1, 2, 3, 4, 5, or 6, a QPSK modulation value of j, −1, −j, j, −1, or −j is loaded on SR resources and then transmitted. In this case, SR is indicated by the presence or absence (i.e., ON/OFF keying) of signal transmission on SR resources, and ACK/NACK is indicated by a modulation value on SR resources. Although this example shows that a state indicating the number of ACKs is repeated two times on a single QPSK modulation value, it should be noted that the state indicating the number of ACK signals may not overlap on a single QPSK modulation value as necessary.

Table 17 shows ACK/NACK bits (b(0),b(1)) located on an SR format for SR+ACK/NACK transmission of FIG. 32. In Table 17, the number of ACKs may include the number of ACKs for a normal PDSCH and an ACK for Semi Persistent Scheduling (SPS) PDSCH. PDCCH for PDSCH scheduling may include information regarding a total number of PDCCHs (or PDSCHs) scheduled for the corresponding UE, and order information (e.g., counter) of the scheduled PDCCH (or PDSCH). In this case, if some PDCCHs (or PDSCHs) are lost, the UE recognizes a DTX. If at least one DTX occurs, the number of ACKs may be fed back as zero 0.

TABLE 17

| Number of ACK among multiple ACK/NACK responses | b(0), b(1) |
|---|---|
| 0 or None (UE detect at least one DL assignment is missed) | 0, 0 |
| 1 | 1, 1 |

TABLE 17-continued

| Number of ACK among multiple ACK/NACK responses | b(0), b(1) |
|---|---|
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

As modification of FIG. 32, during transmission of SR+ACK/NACK, ACK/NACK information for multiple DL CCs is replaced with one representative information through a logical AND (or logical OR) operation for multiple DL CCs, bundled information may be modulated on SR resources and transmitted.

Figure 33:
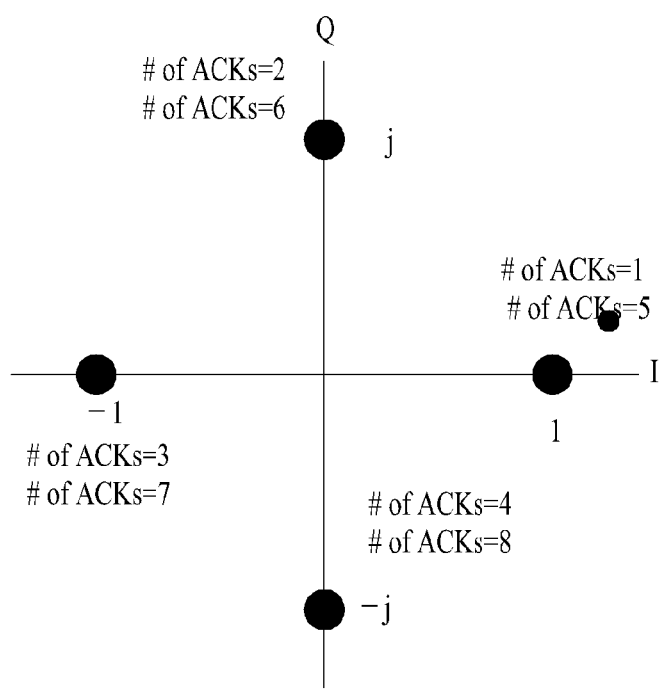

FIG. 33 is a conceptual diagram illustrating a method for simultaneously transmitting SR+ACK/NACK according to an embodiment of the present invention. Simultaneous transmission of SR+ACK/NACK may be achieved when ACK/NACK transmission is triggered in a subframe where SR transmission is triggered. In this case, ACK/NACK information is converted into SR format and transmitted, so that simultaneous transmission of SR+ACK/NACK may be possible.

Referring to FIG. 33, during transmission of SR+ACK/NACK, if the ACK/NACK responses for multiple DL CCs are all NACK, DTX is transmitted. If at least one ACK/NACK response is ACK, information regarding the number of ACKs is loaded on SR resources and then transmitted. However, the scope or spirit of the present invention is not limited thereto, and the UE drops transmission of a specific RS symbol (e.g., a second RS symbol) so that DTX occurrence may be fed back to the BS. In this case, NACK may include not only a case in which downlink data fails to decode but also a case in which discontinuous transmission (DTX) occurs. DTX occurrence may be inferred from counter information contained in a PDCCH for downlink scheduling. Counter information may indicate an order of a scheduled PDCCH (or PDSCH) or a total number of scheduled PDCHs (or PDSCHs).

In more detail, if the number of ACK signals is 1, 2, 3, 4, 5, 6, 7 or 8, a QPSK modulation value of 1, j, −1, −j, 1, j, −1 or −j is loaded on SR resources and then transmitted.

Although this example shows that a state indicating the number of ACKs is repeated two times on a single QPSK modulation value, it should be noted that the state indicating the number of ACK signals may not overlap on the single QPSK modulation value as necessary.

An exemplary case for transmitting CQI/PMI/RI will hereinafter be described in detail.

PUCCH format adaptation may be carried out on the basis of the number of UCI bits. In this case, a threshold value of the number of UCI bits in consideration of LTE may be 11 bits. For example, if UCI has the size of 11 bits or less, the legacy LTE PUCCH format 2 may be used. If UCI has the size of 12 bits or more, PUCCH format 2 may be used using MSM. In this case, MSM-based PUCCH format 2 may be replaced with an arbitrary CA PUCCH format (DFT-s-OFDMA PUCCH format). The channel coding process for MSM may include TBCC (Tail-biting Convolutional Coding) and rate-matching defined in LTE. Resources for MSM may be pre-assigned to the UE through RRC configuration, or may be inferred from resources allocated at PUCCH format 2. For example, it is assumed that two resources for MSM are needed and $n_{PUCCH}^{(2)}$ is allocated for PUCCH format 2. In this case, the resource $n_{PUCCH}^{(2)}$ may be used as a first resource fo MSM. Preferably, MSM resources may be present in the same PRB, so that a second resource for MSM may have a cyclic shift resource different from that of the first MSM resource.

For example, after the cyclic shift value $n_{cs}^{(2)}$ used in $n_{PUCCH}^{(2)}$ is inferred, $n_{cs}^{(2)}+\Delta_{shift}^{PUCCH}$ or $(n_{cs}^{(2)}+\Delta_{shift}^{PUCCH}) \mod(12/\Delta_{shift}^{PUCCH})$ is applied and its associated resource $(n_{PUCCH}^{(2)})'$ is inferred, so that the resultant resource may be used as a second resource for MSM. That is, $\Delta_{shift}^{PUCCH}$ may be used as an offset for a second resource of MSM. Therefore, a cyclic shift spacing between two resources is determined to be $\Delta_{shift}^{PUCCH}$. That is, the cyclic shift of the first resource is spaced apart from the cyclic shift of the second resource by a predetermined distance $\Delta_{shift}^{PUCCH}$. If $\Delta_{shift}^{PUCCH}$ is set to 2 or more, a cycle shift value $n_{cs}^{(2)}$ used in $n_{PUCCH}^{(2)}$ is inferred in such a manner that the cyclic shift between CS intervals can be effectively used. Thereafter, $n_{cs}^{(2)}+1$ or $(n_{cs}^{(2)}+1) \mod(12)$ is applied to the inference result, and its associated $(n_{PUCCH}^{(2)})'$ is inferred so that this inference result can be used as a second resource for MSM. Although the present invention can also be applied to the case of $\Delta_{shift}^{PUCCH}=1$, it should be noted that a little scheduling restriction exists. An offset that has been applied in a positive (+) direction to a first cyclic shift value of MSM may also be applied to a negative (−) direction.

Figure 34:
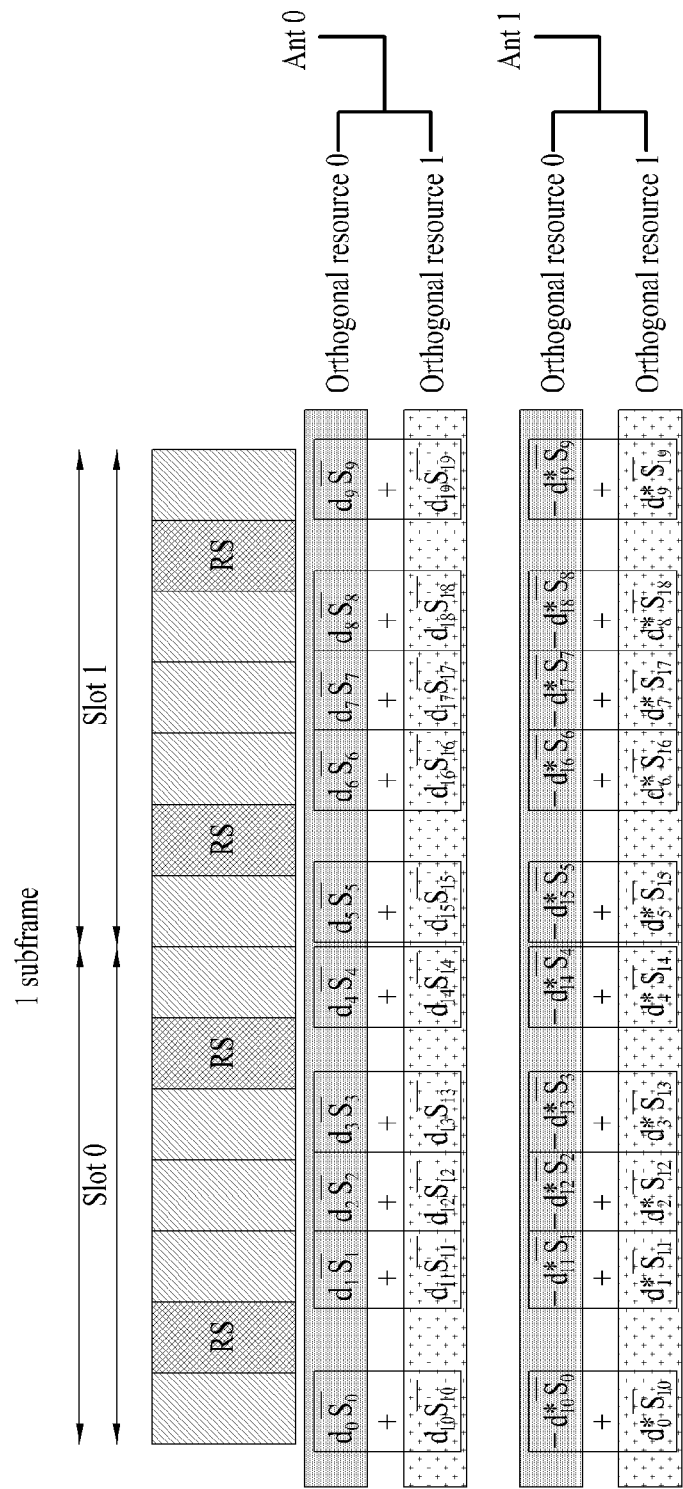
FIG. 34 is a conceptual diagram illustrating a Space Code Block Coding (SCBC) according to one embodiment of the present invention.

FIG. 34 is a conceptual diagram illustrating a method for transmitting PUCCH using a Space Code Block Coding (SCBC). Although the PUCCH transmission method of FIG. 34 exemplarily shows an SCBC applied to an MSM-based PUCCH format 2 for convenience of description, the method of FIG. 34 can also be applied to any of PUCCH formats using MSM. In FIG. 34, $d_i$ (i=0, 1, ..., 19) denotes symbols that are channel-coded and QPSK-modulated. A total number of QPSK modulation symbols in two slots is 10, and a total of 20 QPSK modulation symbols can be mapped to two antennas (or two antenna ports). $\bar{s}_j$ (j=0, 1, ..., 19) is a vector indicating a sequence [for example, a computer sequence (including cyclic shift application)] mapped to subcarriers in one RB, and has a length corresponding to the number (e.g., 12) of subcarriers in one RB.

Referring to FIG. 34, multi-sequences transmitted through Antenna (port) 0 can be transmitted in the same manner as in 1Tx transmission. On the other hand, precoding (e.g., Alamouti coding) for transmit diversity for use in a space-code domain is applied to multi-sequences transmitted through Antenna (port) 1. In this case, the Alamouti coding may include not only a matrix shown in Equation 10 but also all unitary conversion formats for the matrix.

[Equation 10]

$$\text{Orthogonal resource domain} \begin{pmatrix} \text{antenna} \\ \begin{pmatrix} S_0 & -(S_1)^* \\ S_1 & (S_0)^* \end{pmatrix} \end{pmatrix}$$

In Equation 10, (.)* is denoted by a complex conjugate operation of (.). In FIG. 34, $s_o$ is a sequence loaded on orthogonal resource 0 of antenna (port) 0, $s_1$ is a sequence loaded on orthogonal resource 1 of antenna (port) 0. $-(s_1)^*$ is a sequence loaded on orthogonal resource 0 of antenna (port) 1, and $(s_0)^*$ is a sequence loaded on orthogonal resource 1 of antenna (port) 1. Although FIG. 34 exemplarily shows that SCBC is applied in units of a subframe, the SCBC of the present invention may be independently carried out in units of a smaller time unit (e.g., a slot unit).

As described above, UCI is transmitted using two resources for each antenna, and transmit diversity is applied to UCI between antennas. In other words, two resources for RS may be used as channel estimation for each antenna (port). For example, RS transmitted through a first antenna is configured to use a first resource (=PUCCH format 2 resource), and RS transmitted through a second antenna is configured to use a second resource. That is, RS may be transmitted using only one resource for each antenna.

Figure 35:
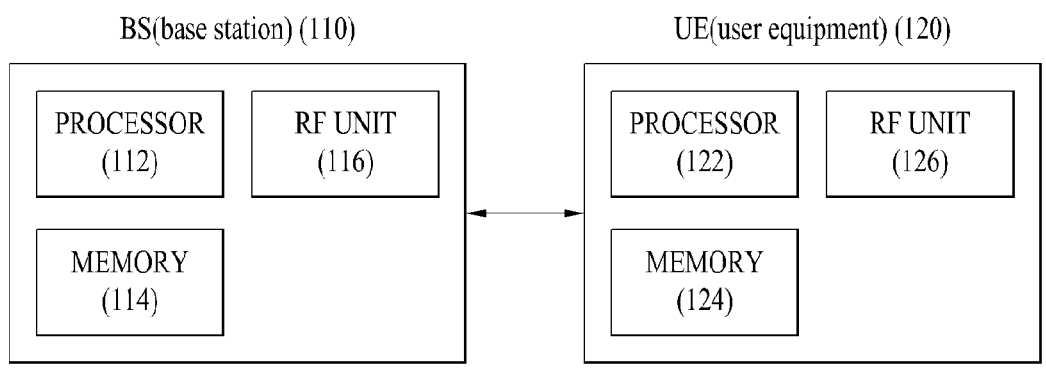
FIG. 35 is a block diagram illustrating a base station (BS) and a user equipment (UE) applicable to embodiments of the present invention.

FIG. 35 is a block diagram illustrating a base station (BS) and a user equipment (UE) applicable to embodiments of the present invention.

Referring to FIG. 35, the wireless communication system includes a base station (BS) 110 and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the eNB (or BS) as the case may be. In other words, it will be apparent that various operations performed for communication with the UE in the network which includes a plurality of network nodes along with the eNB (or BS) can be performed by the BS or network nodes other than the eNB (or BS). The term eNB (or BS) may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are included in the scope of the invention.

INDUSTRIAL APPLICABILITY

Exemplary embodiments of the present invention can be applied to a user equipment (UE), a base station (BS), and other devices. In more detail, the present invention can be applied to a method and apparatus for transmitting uplink control information.

The invention claimed is:

1. A method for allowing a user equipment (UE) to transmit uplink control information in a subframe configured for transmitting of a scheduling request in a wireless communication system, the method comprising:
receiving a radio resource control (RRC) signal for configuring a physical uplink control channel (PUCCH) format for acknowledgement transmission among a plurality of PUCCH formats; and
transmitting acknowledgement information through a PUCCH based on the configured PUCCH format,
wherein when the UE is configured with a first PUCCH format, transmitting the acknowledgement information includes:
channel coding control information bits including at least one acknowledgement information bit and a scheduling request information bit using Reed-Muller (RM) codes to generate channel coded control information bits, the at least one acknowledgement information bit being placed before the scheduling request information bit,
modulating the channel coded control information bits to generate $N_1$ modulation symbols, wherein $N_1$ is twice of a number of subcarriers in one resource block (RB),
discrete fourier transformation (DFT) precoding $N_1/2$ modulation symbols of the $N_1$ modulation symbols to generate a first sequence,
DFT precoding another $N_1/2$ modulation symbols of the $N_1$ modulation symbols to generate a second sequence, and
transmitting the first and second sequences using a PUCCH resource allocated for hybrid automatic repeat request acknowledgement (HARQ-ACK) transmission in the subframe, wherein the first sequence is transmitted in a $1^{st}$ slot of the subframe, and the second sequence is transmitted in a $2^{nd}$ slot of the subframe, and
wherein when the UE is configured with a second PUCCH format, transmitting the acknowledgement information includes:
channel coding the acknowledgement information to generate second control information including a two bit value indicating a counter of acknowledgements,
transmitting the second control information using a PUCCH resource allocated for scheduling request transmission in the subframe.

2. The method according to claim 1, wherein a plurality of component carriers (CCs) are configured for the UE.

3. The method according to claim 1, wherein the control information further includes channel quality information bits.

4. The method according to claim 1, wherein the subframe includes SC-FDMA symbols for a $1^{St}$ reference signal and a $2^{nd}$ reference signal, and
wherein a transmission of the $1^{St}$ reference signal is performed but a transmission of the $2^{nd}$ reference signal is dropped when a discontinuous transmission (DTX) is detected.

5. A user equipment (UE) configured to transmit signals in a subframe configured for transmitting of a scheduling request in a wireless communication system, the UE comprising:
a radio frequency (RF) unit; and
a processor,
wherein the processor is configured to receive a radio resource control (RRC) signal for configuring a physical uplink control channel (PUCCH) format for acknowledgement transmission among a plurality of PUCCH formats, and to transmit acknowledgement information through a PUCCH based on the configured PUCCH format,
wherein when the UE is configured with a first PUCCH format, transmitting the acknowledgement information includes:
channel coding control information bits including at least one acknowledgement information bit and a scheduling request information bit using Reed-Muller (RM) codes to generate channel coded control information bits, the at least one acknowledgement information bit being placed before the scheduling request information bit,
modulating the channel coded control information bits to generate $N_1$ modulation symbols, wherein $N_1$ is twice of a number of subcarriers in one resource block (RB),
discrete fourier transformation (DFT) precoding $N_1/2$ modulation symbols of the $N_1$ modulation symbols to generate a first sequence,
DFT precoding another $N_1/2$ modulation symbols of the $N_1$ modulation symbols to generate a second sequence, and
transmitting the first and second sequences using a PUCCH resource allocated for hybrid automatic repeat request acknowledgement (HARQ-ACK) transmission in the subframe, wherein the first sequence is transmitted in a $1^{st}$ slot of the subframe, and the second sequence is transmitted in a $2^{nd}$ slot of the subframe, and wherein when the UE is configured with a second PUCCH format, transmitting the acknowledgement information includes:

channel coding the acknowledgement information to generate second control information including a two bit value indicating a counter of acknowledgements, and transmitting the second control information using a PUCCH resource allocated for scheduling request transmission in the subframe.

6. The UE according to claim 5, wherein a plurality of component carriers (CCs) are configured for the UE.

7. The UE according to claim 5, wherein the control information further includes channel quality information bits.

8. The UE according to claim 5, wherein the subframe includes SC-FDMA symbols for a $1^{st}$ reference signal and a $2^{nd}$ reference signal, and wherein a transmission of the $1^{st}$ reference signal is performed but a transmission of the $2^{nd}$ reference signal is dropped when a discontinuous transmission (DTX) is detected.

* * * * *